United States Patent
Chen et al.

(10) Patent No.: US 10,038,836 B2
(45) Date of Patent: Jul. 31, 2018

(54) AUTOMATIC IMAGE CAPTURE DURING PREVIEW AND IMAGE RECOMMENDATION

(71) Applicant: MediaTek Inc., Hsinchu (TW)

(72) Inventors: Yu-Sheng Chen, New Taipei (TW); Chia-Da Lee, Tainan (TW); Mu-Hsing Wu, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 135 days.

(21) Appl. No.: 14/942,914

(22) Filed: Nov. 16, 2015

(65) Prior Publication Data
US 2016/0073036 A1    Mar. 10, 2016

Related U.S. Application Data

(60) Provisional application No. 62/134,138, filed on Mar. 17, 2015.

(51) Int. Cl.
| H04N 5/232 | (2006.01) |
| H04N 5/77 | (2006.01) |
| H04N 1/21 | (2006.01) |

(52) U.S. Cl.
CPC ....... *H04N 5/23222* (2013.01); *H04N 1/2112* (2013.01); *H04N 5/232* (2013.01); *H04N 5/23245* (2013.01); *H04N 5/23293* (2013.01); *H04N 5/77* (2013.01); *H04N 5/772* (2013.01)

(58) Field of Classification Search
CPC ......... H04N 5/232222; H04N 5/23293; H04N 1/00408–1/00464; H04N 1/21–1/2145
See application file for complete search history.

(56) References Cited

U.S. PATENT DOCUMENTS

| 2010/0026715 A1* | 2/2010 | Garbow ................. G03B 13/00 345/642 |
| 2010/0201832 A1 | 8/2010 | Che et al. |
| 2010/0262911 A1 | 10/2010 | Kaplan et al. |
| 2012/0084731 A1 | 4/2012 | Filman et al. |
| 2012/0242849 A1* | 9/2012 | Herz ................. H04N 5/23293 348/208.99 |
| 2013/0201359 A1 | 8/2013 | Wu et al. |
| 2013/0222640 A1* | 8/2013 | Baek ................. G11B 27/3027 348/231.99 |
| 2014/0002342 A1 | 1/2014 | Fedorovskaya et al. |

(Continued)

FOREIGN PATENT DOCUMENTS

JP    2012-235481    11/2012

OTHER PUBLICATIONS

Rocca; D., Partial European Search Report, European Patent Application No. EP 16 16 0987, dated Aug. 17, 2016, The Hague.

*Primary Examiner* — Paul Berardesca
(74) *Attorney, Agent, or Firm* — Han IP Corporation; Andy M. Han

(57) ABSTRACT

Techniques and implementations related to automatic image capture during preview, as well as recommendation of images, are described. A method for operating an electronic apparatus may involve receiving a stream of one or more preview images in a preview mode of the electronic apparatus. The method may also involve determining whether any preview image of the stream of preview images is valuable. The method may further involve controlling an operation of the electronic apparatus in response to the determining.

37 Claims, 8 Drawing Sheets

(56) References Cited

U.S. PATENT DOCUMENTS

2014/0111670 A1 4/2014 Lord et al.
2014/0354845 A1 12/2014 Molgaard et al.
2015/0071547 A1 3/2015 Keating et al.

* cited by examiner

AUTOMATIC IMAGE CAPTURE DURING PREVIEW AND IMAGE RECOMMENDATION

CROSS REFERENCE TO RELATED PATENT APPLICATION

The present disclosure claims the priority benefit of U.S. Provisional Patent Application No. 62/134,138, filed on 17 Mar. 2015, which is incorporated by reference in its entirety.

TECHNICAL FIELD

The present disclosure is generally related to digital images and, more particularly, to automatic image capture during preview and recommendation of images.

BACKGROUND

Unless otherwise indicated herein, approaches described in this section are not prior art to the claims listed below and are not admitted to be prior art by inclusion in this section.

With advancements in digital imaging technologies, more and more portable electronic apparatuses (e.g., smartphones and tablet computers) are equipped with the capability of capturing digital images, including still images and video images. Often time the most beautiful and memorable moments are unpredictable and not reproducible, especially when a user of an electronic apparatus with digital imaging capability may not be ready or well-prepared to take photographs or videos. For example, when a toddler speaks out his/her very first word or when a child is in an adorable pose, the parent would very much wish to capture still images or video images of the memorable moment. One approach to avoid missing out capturing images of any beautiful or memorable moment is for a user to take continuous shots. Another approach is to use long-time video recording for unpredictable beautiful/memorable moments. However, both continuous shots and long-time video recording may be very inefficient in terms of memory storage and power consumption, let alone inconvenience to the user. Moreover, the how valuable an image may be (herein interchangeably referred to as "valuableness") tends to vary from person to person, and even from time to time for the same person. Besides, the valuableness of an image may depend on the content of the image and a user interest in the content of the image.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In one example implementation, a method for operating an electronic apparatus may involve receiving a stream of video images. The method may also involve determining whether any image of the video images is valuable. The method may further involve controlling an operation of the electronic apparatus in response to the determining.

In another example implementation, a method may involve a processor associated with an electronic apparatus detecting that the electronic apparatus operates in a preview mode. The method may also involve the processor performing a number of operations including: receiving from the electronic apparatus a stream of video images when the electronic apparatus is in the preview mode; determining whether any of the one or more video images is valuable; and controlling an operation of the electronic apparatus in response to the determining.

In yet another example implementation, an apparatus may include one or more processors and a memory configured to store a number of components executable by the one or more processors. The components may include a receiving module, a determination module and a control module. The receiving module may be configured to receive a stream of video images. The determination module may be configured to determine whether any image of the video images is valuable. The control module may be configured to control an operation of the electronic apparatus in response to the determining by the determination module.

Advantageously, implementations in accordance with the present disclosure provide intelligent and user-friendly backup of important yet unpredictable moments, in the form of digital images. Moreover, there is no wasted memory storage space with implementations in accordance if the user does not select any of the images. In contrast, under existing approaches of continuous shots and single captures, an active intent of the user to take photos and an associated action (e.g., a push of button(s)) are required for predictable moments, and this may be memory inefficient. Additionally, under existing approaches of video recording, the active intent of the user to take a sequence of images and an associated action (e.g., a push of button(s)) are required for any moment to be recorded, and this may also be memory inefficient.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
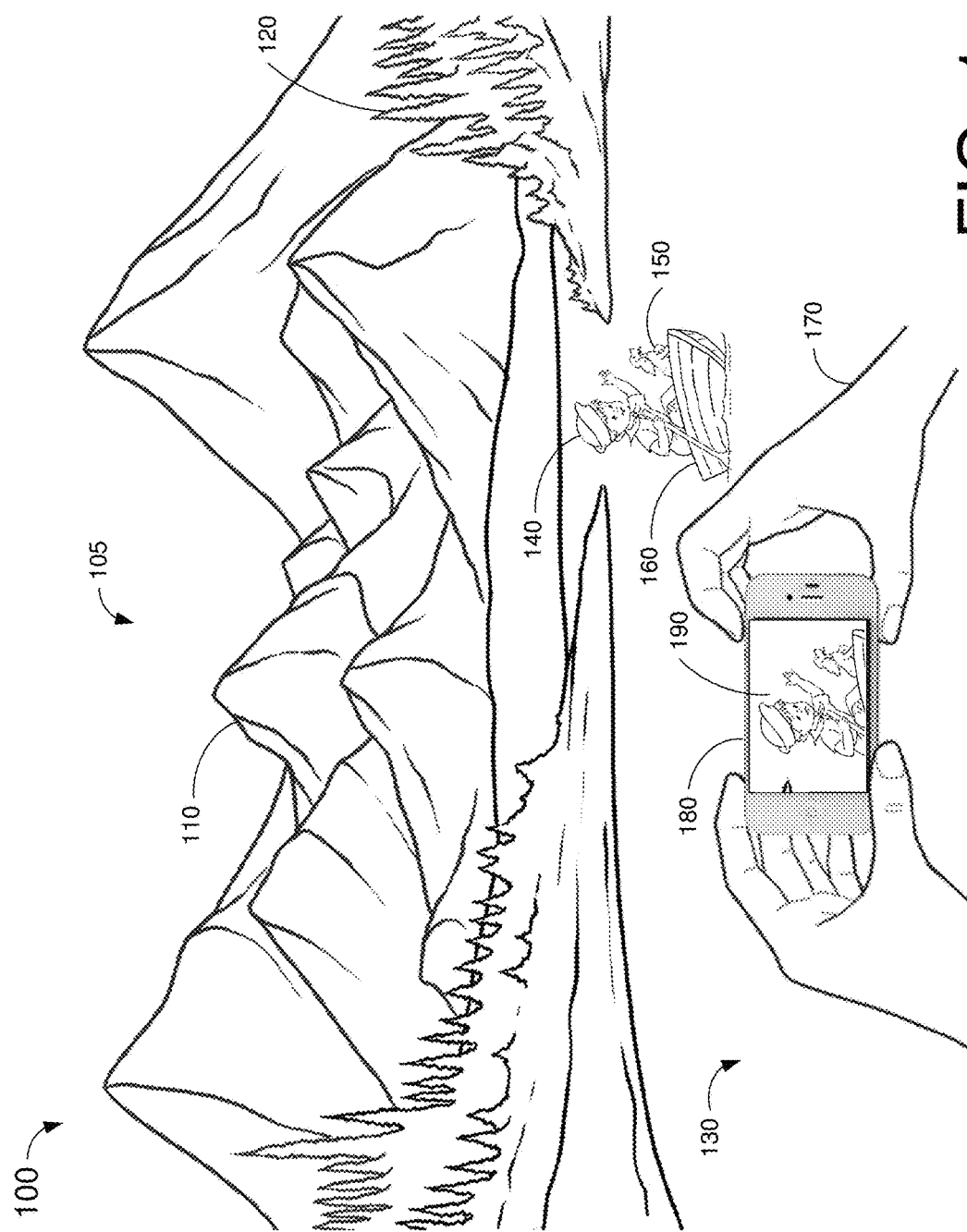
FIG. 1 is a diagram of an example environment in which various implementations in accordance with the present disclosure may be implemented.

FIG. 1 illustrates an example environment 100 in which various implementations in accordance with the present disclosure may be implemented. Example environment 100 may include a surrounding, background or scene 105 which may include, as shown in the example of FIG. 1, mountains 110, trees or forest 120 and a lake 130. Scene 105 may also include a child 140 and a pet dog 150 who are on a boat 160 in lake 130. A user 170 may operate a portable electronic apparatus 180 in example environment 100 to capture still images and/or video images of child 140 and/or pet dog 150.

Portable electronic apparatus 180 may be, for example, a smartphone, a computing device such as a tablet computer, a laptop computer, a notebook computer, a wearable device or the like. Portable electronic apparatus 180 may be equipped with an imaging device, e.g., camera, capable of capturing still images and/or video images. Portable electronic apparatus 180 may also be equipped with a user interface device 190 which may include, for example, a display panel or screen, a touch-sensing panel, one or more speakers, a keyboard and/or one or more lights. Imaging device of portable electronic apparatus 180 is not shown in FIG. 1 as it would be installed on the side of portable electronic apparatus 180 facing away from a reader, e.g., the side opposite to the side on which user interface device 190 is installed. Imaging device of portable electronic apparatus 180 may operate in one of at least a first mode and a second mode. In the first mode (e.g., preview mode), imaging device may capture images by a first quality. In the second mode (e.g., capture mode), imaging device may capture images by a second quality equal to or higher than the first quality.

When powered on, portable electronic apparatus 180 may operate in one of a number of operational modes including, for example, a preview mode and a capture mode. In the preview mode, images captured by the imaging device of portable electronic apparatus 180 may be displayed, shown or otherwise presented by user interface device 190 of portable electronic apparatus 180 but not necessarily saved. In the capture mode, one or more images may be captured by the imaging device of portable electronic apparatus 180 at a higher quality higher than a quality of preview images captured in the preview mode. In addition, the one or more images captured in the capture mode may be displayed, shown or otherwise presented by user interface device 190 of portable electronic apparatus 180 as well as saved or otherwise stored in an album of portable electronic apparatus 180. Portable electronic apparatus 180 may, by default or user settings, operate in the preview mode upon being powered on, and may require a user input to switch to operate in another operational mode such as the capture mode in order to save the captured images in the album of portable electronic apparatus 180.

Portable electronic apparatus 180 may operate in accordance with the present disclosure. Advantageously, operations of portable electronic apparatus 180 may include a number of novel and non-obvious features not found in existing approaches, including an automatic storage/capture feature and a target of interest (TOI) detection feature.

In some embodiments, the automatic storage/capture feature may enable portable electronic apparatus 180 to automatically save one or more valuable images, at least for a temporary moment. In some embodiments, the one or more valuable images may be temporarily saved while portable electronic apparatus 180 operates in the preview mode. Alternatively or additionally, the automatic storage/capture feature may enable portable electronic apparatus 180 to automatically enter the capture mode to capture/record one or more valuable images at a higher quality, and at least temporarily saved while portable electronic apparatus 180 operates in the capture mode. In addition, in both embodiments, portable electronic apparatus 180 may recommend one or more valuable images to user for selection by the user to be further non-temporarily saved in an album. To recommend such image(s) as valuable image(s) to user 170, portable electronic apparatus 180 may display, show or otherwise present notification messages and/or thumbnail images on user interface device 190 for user 170 to select one or more preview images.

The TOI detection feature may enable portable electronic apparatus 180 to determine which image(s) of one or more images captured in the preview mode as possibly containing information or content of interest to user 170, and thus being valuable to user 170. Accordingly, there is no need for user 170 to judge whether any of the previewed images is valuable before the one or more valuable images are temporarily stored.

With the TOI feature in combination with the automatic capture feature, portable electronic apparatus 180 may further recommend such image(s) as valuable image(s) to user 170 for further saving or storage non-temporarily. To recommend such image(s) as valuable image(s) to user 170, portable electronic apparatus 180 may display, show or otherwise present notification messages and/or thumbnail images on user interface device 190 for user 170 to select one or more preview images.

In one embodiment of the TOI detection feature, after the content of an image is recognized or otherwise discerned, the TOI detection feature may enable portable electronic apparatus 180 to determine the valuableness of the image based at least in part on a level of interest of all content of user 170, which may vary in time. The TOI detection feature may also enable portable electronic apparatus 180 to incrementally learn the personal interest of user 170, e.g., from selections of images by user 170 and one or more other sources of available information such as websites and social networks. As an example, portable electronic apparatus 180 may maintain a record of one or more criteria for use in the evaluation of a user level of interest in the image. In particular, portable electronic apparatus 180 may receive a first user input indicative of a user preference, receive a second user input that configures settings, identify and record a user selection of one or more images of the video images, identify and record one or more patterns in one or more offline photo albums, identify and record one or more patterns in one or more online albums, identify and record a user preference of images on one or more social networks, and/or identify and record personal information contained in an online user profile.

The TOI detection feature may enable portable electronic apparatus 180 to categorize TOIs into multiple TOI categories. TOI detection feature may also identify one or more objects in an image, determine whether they are TOIs and categorize the TOIs in the objects in to the TOI categories, if the image includes one or more TOIs. The multiple TOI categories may include, for example and not limited to, specific faces of people and/or animals, specific objects, specific motions and/or gestures, specific activities, specific plants, specific landscapes and specific sceneries. In this example, both child 140 and pet dog 150 may be TOIs which are valuable to user 170, while none of mountains 110, trees/forest 120 and lake 130 is a TOI to user 170.

Each of the TOI categories can be associated with different interest values. For instance, Portable electronic apparatus 180 may store therein numerous values of user level of interest associated with numerous TOIs in various categories of TOI. In the example shown in FIG. 1, both child 140 and pet dog 150 may be TOIs which are valuable to user 170, while a user level of interest in child 140 may be higher than a user level of interest in pet dog 150. This means that the interest value associated with the CHILD category can be higher than the interest value associated with the DOG category. The portable electronic apparatus 180 can determine the valuableness of the image based the categorization, at least based on the interest values associated with the CHILD category and the DOG category.

When portable electronic apparatus 180 operates in the preview mode, the imaging device of portable electronic apparatus 180 may continuously capture preview images as a stream of video images. The TOI feature may enable portable electronic apparatus 180 to determine whether any image, e.g., preview image, of the stream of video images captured by the imaging device of portable electronic apparatus 180 is valuable and operate in accordance with a result of the determination. In an event that no image of the video images is determined to be valuable (e.g., none of the video image contains an image of child 140 or pet dog 150), portable electronic apparatus 180 may continue to operate in the preview mode.

Portable electronic apparatus 180 may store at least temporarily one or more valuable images of the video images in response to the determination. For instance, at least one video image containing an image of child 140 and/or pet dog 150 may be temporarily stored in portable electronic apparatus 180 as a valuable image. Portable electronic apparatus 180 may also provide a visual or audio notification, visible or audible to user 170, to indicate the existence of the one or more valuable image. Alternatively or additionally, portable electronic apparatus 180 may display a representation of the one or more valuable images, e.g., as thumbnails on user interface device 190.

In determining whether any image of the video images is valuable, portable electronic apparatus 180 may obtain a respective value of user level of interest of user 170 for each of the one or more video images.

When there are multiple valuable images, portable electronic apparatus 180 may sort or rank the multiple valuable images, e.g., according to the respective values of user level of interest for multiple value images. Portable electronic apparatus 180 may then display the multiple valuable images, e.g., as thumbnails on user interface device 190, in a sorted order according to the respective values of user level of interest associated with the multiple valuable images.

Alternatively or additionally, in determining whether any image of the video images is valuable, portable electronic apparatus 180 may identify one or more elements in an image as belonging to one or more predefined categories and evaluate whether the image as being valuable based on the one or more predefined categories. Alternatively or additionally, in determining whether any image of the video images is valuable, portable electronic apparatus 180 may determine that an image of the video images is valuable when the image contains one or more TOIs and is evaluated to have an overall user interest value higher than a threshold value.

When presented with the thumbnails of the multiple valuable images, e.g., multiple preview images of child 140 and/or pet dog 150, user 170 may enter a user input, e.g., via user interface device 190, to select at least one of the multiple valuable images for non-temporary or permanent storage in portable electronic apparatus 180. Accordingly, portable electronic apparatus 180 may determine whether such an input is received via user interface device 190 and, in response, non-temporarily store the selected image of the one or more valuable images in an online or offline album. Alternatively, upon receiving an input of selection from user 170, portable electronic apparatus 180 may either delete at least one non-selected image other than the at least one selected image of the multiple valuable images. In an event that no user input is received from user 170, portable electronic apparatus 180 may delete the one or more valuable images.

In response to a determination that at least one of the video images is valuable, portable electronic apparatus 180 may trigger a video recording by imaging device of portable electronic apparatus 180. Additionally, portable electronic apparatus 180 may determine whether any image in the video recording is valuable and, in response to a determination that no image among a predetermined number of images in the video recording is valuable, stop the video recording. Portable electronic apparatus 180 may also switch the imaging device to operate in the second mode (e.g., capture mode) in response to a determination that a first image of the video images is valuable, and trigger image capturing by the imaging device in the second mode.

Furthermore, portable electronic apparatus 180 may detect that an image of the stream of video images as containing one or more TOIs, evaluate a user level of interest in the image, and determine that the image is valuable according at least to a value of the evaluated user level of interest in the image. For instance, portable electronic apparatus 180 may determine that an image is valuable in an event that the value of the evaluated user level of interest in the image is greater than or equal to a threshold interest value, which may be definable and adjustable by user 170. In particular, in detecting that the image contains the one or more TOIs, portable electronic apparatus 180 may identify one or more elements in a content of the image, determine whether the one or more elements belong to any of one or more predefined categories (which may be definable and adjustable by user 170) to obtain the one or more TOIs, and obtain one or more respective confidence levels associated with the one or more predefined categories of the one or more TOIs. In evaluating the user level of interest in the image, portable electronic apparatus 180 may obtain one or more respective interest values associated with the one or more predefined categories of the one or more TOIs, compute an overall user interest value regarding the image by adding multipliers of the one or more interest values and the one or more confidence levels associated with the one or more predefined categories of the one or more TOIs, and set the value of the evaluated user level of interest in the image based on the overall user interest value regarding the image.

Portable electronic apparatus 180 may receive a user input from user 170 which indicates a selection of one or more valuable images of the one or more video images. In response to receiving the selection, portable electronic apparatus 180 may update at least one interest value associated with at least one of the one or more predefined categories according to the selection.

Figure 2:
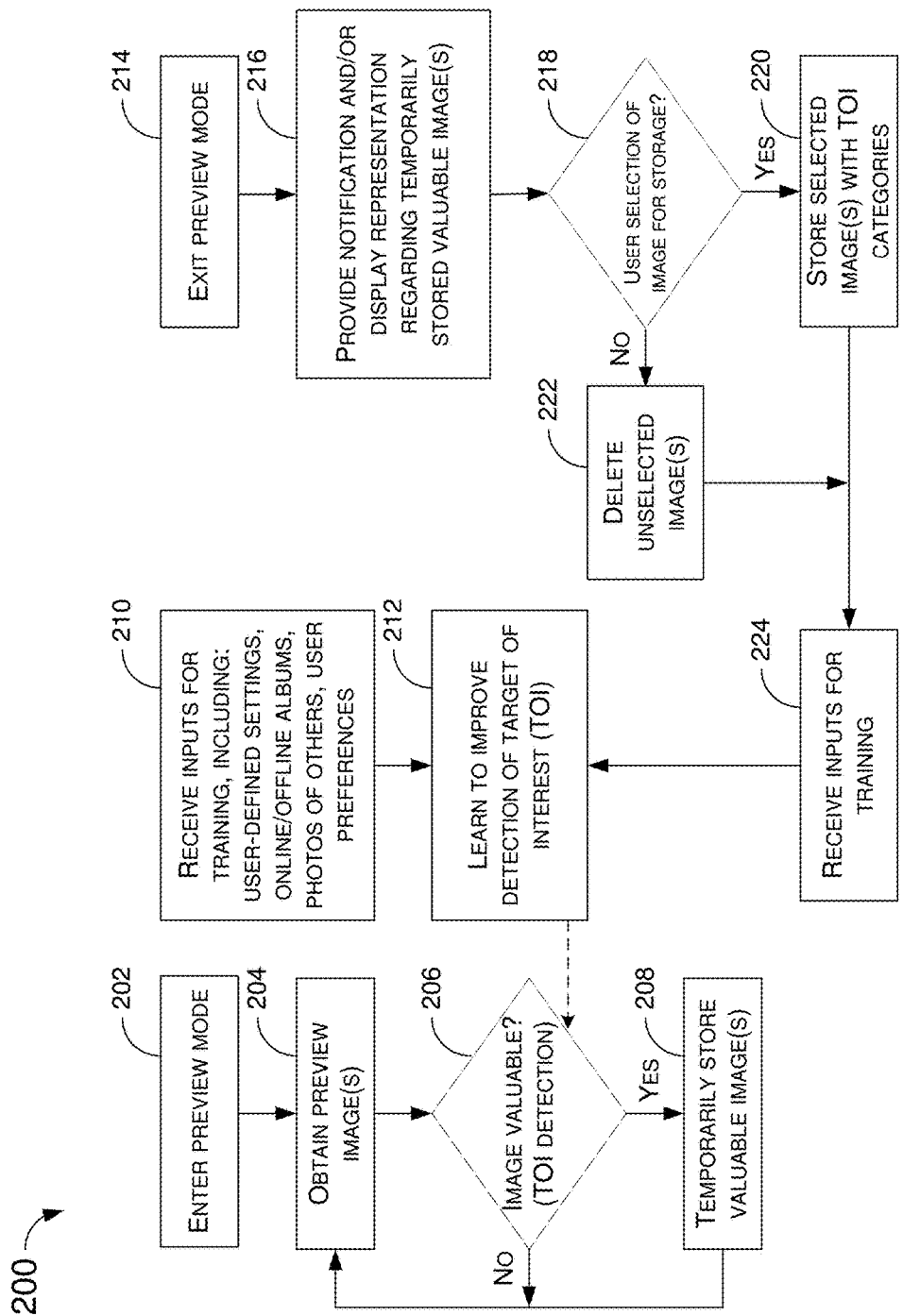
FIG. 2 is a block diagram of an example scheme in accordance with an implementation of the present disclosure.

FIG. 2 illustrates an example scheme 200 in accordance with an implementation of the present disclosure. Example scheme 200 may involve one or more operations, actions, or functions as represented by one or more of blocks 202, 204, 206, 208, 210, 212, 214, 216, 218, 220, 222 and 224. Although illustrated as discrete blocks, various blocks of example scheme 200 may be divided into additional blocks, combined into fewer blocks, or eliminated, depending on the desired implementation. Example scheme 200 may be implemented by portable electronic apparatus 180 in example environment 100 and/or the one or more processors 510 of example apparatus 500 which is to be described below. For illustrative purposes, example scheme 200 is described below in the context of being implemented by portable electronic apparatus 180 of example environment 100.

At 202, example scheme 200 may involve portable electronic apparatus 180 entering or otherwise operating in a preview mode. At 204, example scheme 200 may involve portable electronic apparatus 180 obtaining, taking or otherwise capturing one or more images, e.g., as a stream of video images. As portable electronic apparatus 180 is in preview mode, the captured one or more images may be preview images. At 206, for each of the one or more images, example scheme 200 may involve portable electronic apparatus 180 determining whether the image is valuable to the user. For instance, example scheme 200 may involve portable electronic apparatus 180 determining whether each of the one or more images contains any TOI and evaluating a user level of interest in the image. An image may be determined to be valuable according at least to the value of the evaluated user level of interest in the image. In an event that the image is determined to be not valuable, example scheme 200 may return to 204 to obtain a subsequent image for determination at 206. In an event that the image is determined to be valuable, example scheme 200 may proceed to 208. At 208, example scheme 200 may involve portable electronic apparatus 180 at least temporarily storing each image determined to be valuable.

Example scheme 200 may also involve portable electronic apparatus 180 learning about user preferences of one or more users of portable electronic apparatus 180 so as to better detect TOIs in a given image. At 210, example scheme 200 may involve portable electronic apparatus 180 receiving various inputs for self-training. These various inputs may include, for example, user-defined settings, content of online albums, content of offline albums, photos of persons, animals and/or objects of interest, and any indication of user preferences. At 224, example scheme 200 may involve portable electronic apparatus 180 receiving other inputs for training. For example, portable electronic apparatus 180 may receive information indicative of user selection of one or more images as valuable image(s) for storage as well as information indicative of user selection of one or more images as non-valuable image(s) for deletion. At 212, example scheme 200 may involve portable electronic apparatus 180 leaning to improve its ability in detecting TOIs in images by utilizing some or all of the inputs described above. The result of learning 212 may be utilized at 206 for the determination of whether an image is valuable to the user.

At 214, example scheme 200 may involve portable electronic apparatus 180 exiting the preview mode, e.g., by entering into another operational mode. At 216, example scheme 200 may involve portable electronic apparatus 180 providing notification(s) and/or displaying representation(s) regarding each of one or more images that have been stored as valuable image(s). This is intended to make the user aware of such one or more valuable images in storage. At 218, example scheme 200 may involve portable electronic apparatus 180 determining whether an input from user is for storing or deleting a valuable image. In an event that a user input is received for selection of a valuable image for storage, e.g., the user likes and wants to keep this image, example scheme 200 may proceed to 220. At 220, example scheme 200 may involve portable electronic apparatus 180 storing the selected valuable image and may further involve portable electronic apparatus 180 categorizing the selected valuable image under one or more TOI categories so as to store the selected valuable image with information related to categorization thereof. In an event that a user input is received for selection of a valuable image for deletion, e.g., the user does not desire to keep this image, example scheme 200 may proceed to 222. At 222, example scheme 200 may involve portable electronic apparatus 180 deleting the selected valuable image from its temporary storage. The user selection of one or more temporarily-stored valuable images for storage or deletion may be utilized for portable electronic apparatus 180 to learn to improve TOI detection, as described above.

Figure 3:
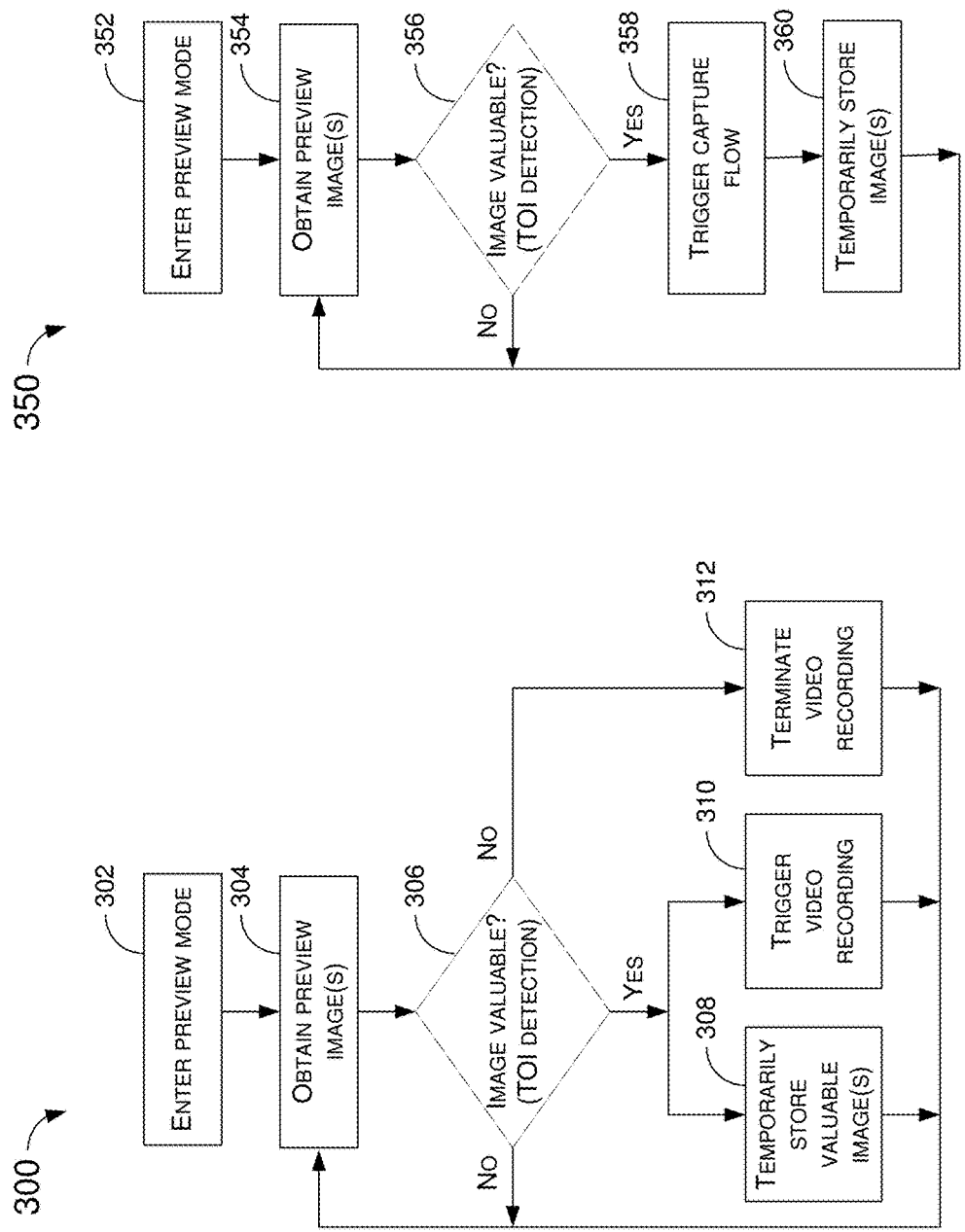
FIG. 3 is a block diagram of two example algorithms in accordance with the present disclosure.

FIG. 3 illustrates two example algorithms 300 and 350 in accordance with the present disclosure. Each of example algorithms 300 and 350 may involve one or more operations, actions, or functions as represented by one or more of blocks 302, 304, 306, 308, 310, 312, 352, 354, 356, 358 and 360. Although illustrated as discrete blocks, various blocks of example algorithms 300 and 350 may be divided into additional blocks, combined into fewer blocks, or eliminated, depending on the desired implementation. Each of example algorithms 300 and 350 may be implemented by portable electronic apparatus 180 in example environment 100 and/or the one or more processors 510 of example apparatus 500 which is to be described below. For illustrative purposes, each of example algorithms 300 and 350 is described below in the context of being implemented by portable electronic apparatus 180 of example environment 100.

Each of example algorithms 300 and 350 may pertain to a respective implementation of the automatic storage/capture feature in accordance with the present disclosure, as there may be trade-off between shutter delay and image quality. Example algorithm 300 may be a first implementation of the automatic storage/capture feature of the present disclosure in which existing image buffer may be directly utilized during the preview mode, e.g., to store a stream of video images as preview images. The implementation may require no sensor or hardware reconfiguration, and may involve image processing for storage, compression and/or formatting purposes, e.g., on demand of the user. For instance, as with zero shutter delay with respect to a camera/imaging device and two-port pass-one image dump output, example algorithm 300 may involve portable electronic apparatus 180 processing a large-sized output for a preview image to become a picture in an event that the preview image is selected by the user for keeping/storage. Moreover, example algorithm 300 may involve portable electronic apparatus 180 using large-sized sensor mode for better resolution of photos, and this may depend on camera settings of the imaging device as well as capabilities of sensor(s) and/or image signal processor(s) of portable electronic apparatus 180. Additionally, example algorithm 300 may involve portable electronic apparatus 180 triggering and terminating a flow of video recording based on one or more factors such as, for example, TOI categories, category interest values, associated confidence levels and/or speed of TOI motion.

Example algorithm 300 may begin at block 302. At 302, example algorithm 300 may involve portable electronic apparatus 180 entering a preview mode. At 304, example algorithm 300 may involve portable electronic apparatus 180 obtaining one or more preview images, e.g., from the imaging device of portable electronic apparatus 180. At 306, example algorithm 300 may involve portable electronic apparatus 180 determining whether each of the one or more preview images is valuable. For instance, example algorithm 300 may involve portable electronic apparatus 180 detecting whether each of the one or more preview images contains any TOI. In an event that it is determined that a preview image is not valuable, e.g., does not include any TOI, example algorithm 300 may return to 304 from 306 to obtain another preview image for determination. In an event that it is determined that a preview image is valuable, e.g., it includes one or more TOIs, example algorithm 300 may proceed to 308 and involve portable electronic apparatus 180 at least temporarily storing the preview image as a valuable image. Alternatively or additionally, example algorithm 300 may proceed to 310 and involve portable electronic apparatus 180 triggering video recording. In an event that video recording is triggered as a result of portable electronic apparatus 180 determining that a preview image is valuable, example algorithm 300 may proceed to 312 and involve portable electronic apparatus 180 terminating the video recording in response to a subsequent preview image being determined as being not valuable.

Example algorithm 350 may be a second implementation of the automatic storage/capture feature of the present disclosure in which video recording may be triggered, and possibly including pre-capture metering (e.g., regarding lens position, light strength and/or color temperature) and/or hardware reconfiguration of sensor(s), image signal processor(s) and/or flashlight for better image quality. In some implementations, the metering and hardware reconfiguration of one or more components of portable electronic apparatus 180, including the imaging device, may be in accordance with any, some or all of the following: TOI categories, category interest values, confidence levels, and positions and/or motions of all observed TOIs. As an example, the imaging device of portable electronic apparatus 180 may perform auto-focus for TOIs of high priority or user level of interest such as, for example, faces of people or the face of relatives and/or loved one(s). As another example, portable electronic apparatus 180 may also adjust the metering speed and/or auto-centering regarding the imaging device, and may also perform image cropping based on the position and/or motion of a TOI. As a further example, portable electronic apparatus 180 may also ignore TOIs with low confidence levels and/or low category interest values.

Example algorithm 350 may begin at block 352. At 352, example algorithm 350 may involve portable electronic apparatus 180 entering the preview mode. At 354, example algorithm 350 may involve portable electronic apparatus 180 obtaining one or more preview images, e.g., from the imaging device of portable electronic apparatus 180. At 356, example algorithm 350 may involve portable electronic apparatus 180 determining whether each of the one or more preview images is valuable. For instance, example algorithm 350 may involve portable electronic apparatus 180 detecting whether each of the one or more preview images contains any TOI. In an event that it is determined that a preview image is not valuable, e.g., does not include any TOI, example algorithm 350 may return to 354 from 356 to obtain another preview image for determination. In an event that it is determined that a preview image is valuable, e.g., it includes one or more TOIs, example algorithm 350 may proceed to 358 and involve portable electronic apparatus 180 triggering capture flow to capture a flow or stream of images in a capture mode, so as to obtain images or photos of a quality better than that of images obtained in the preview mode. For example, an image captured in the capture mode may have better resolution and more pixels compared to an image obtained in the preview mode. At 360, example algorithm 350 may proceed to 358 and involve portable electronic apparatus 180 at least temporarily storing the preview image as a valuable image. Example algorithm 350 may proceed from 360 to 354 to obtain another preview image for determination.

Figure 4:
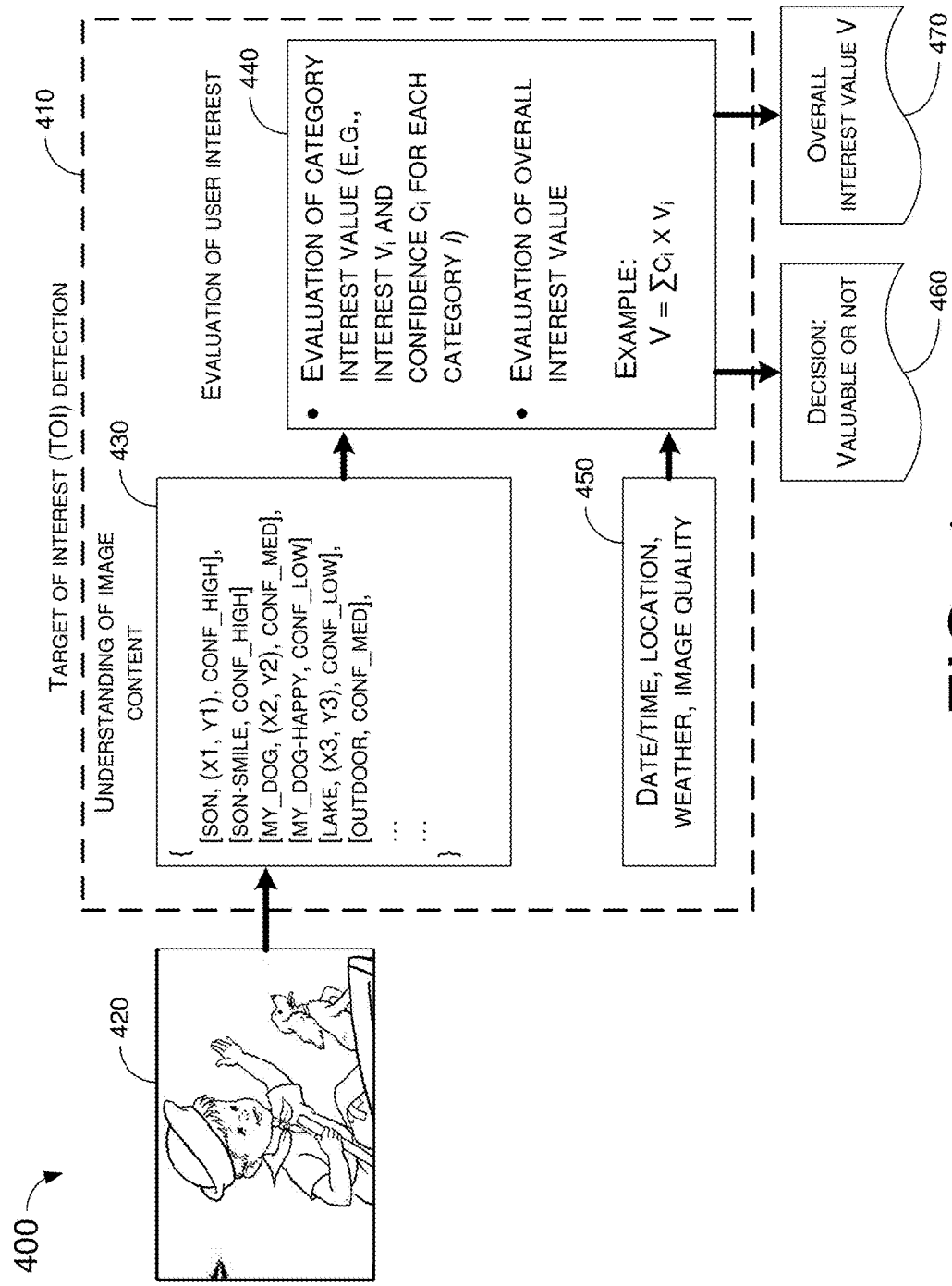
FIG. 4 is a block diagram of an example scheme in accordance with an implementations of the present disclosure.

FIG. 4 illustrates an example scheme 400 in accordance with an implementations of the present disclosure. Example scheme 400 may be implemented by portable electronic apparatus 180 in example environment 100 as described above. Example scheme 400 may pertain to an implementation of the TOI detection feature in accordance with the present disclosure. As with example scheme 200, example scheme 400 may involve portable electronic apparatus 180 receiving various inputs for self-training to learn how to evaluate the valuableness of various images for enhanced TOI detection. These various inputs may include, for example, some or all of the following: image selections made by user(s), user settings, images/photos in one or more local/offline photo albums, images/photos in one or more online photo albums, and one or more social networks. For instance, information obtained from one or more social networks may include images of the user's most-liked photos/pictures (for learning about people/objects of interest), photos of family members and close friends (for learning about people of interest, and personal information of the user from an online profile of the user (for learning about sports, movies, interests, hobbies and events that are of interest to the user). Under example scheme 400, portable electronic apparatus may display, show or otherwise present notifications and/or representations, e.g., thumbnails, of valuable images in a sorted order, e.g., in an ascending order or descending order, according to an estimated user level of interest. TOI categories and values associated with the user level of interest of each image may also be provided.

Example scheme 400 may also pertain to evaluation of valuableness of images. Under example scheme 400, the evaluation of valuableness of images may include two parts. A first part may involve understanding of image content. A second part may involve interest evaluation. With respect to understanding of image content, example scheme 400 may involve portable electronic apparatus 180 understanding the content of an image by recognizing specific image elements in the image such as, for example, people/animals, and status of the emotion and/or action of the people/animals, background environment and scene. Example scheme 400 may also involve portable electronic apparatus 180 classifying those recognized image elements into TOI categories (e.g., woman, happy, dog, grass, sunset, outdoor) with corresponding confidence levels which may be utilized for accuracy in recognition. The user may define categories, e.g., my_daughter, and the user may provide images or characteristics associated with one or more user-defined categories for training purpose. In general, under example scheme 400 the understanding of image content may depend solely on publicly available information and recognition techniques, which may be updated and improved by one or more global central servers.

With respect to interest evaluation or evaluation of user interest, example scheme 400 may involve portable electronic apparatus 180 evaluating user interest in images based on recognized image elements and associated confidence levels. For instance, an overall interest value V may be a combination of multiple category interest values $v_i$ and their confidence levels $c_i$ for all categories i. The confidence level $c_i$ may indicate how confident an image element is recognized to be a TOI, i.e., indicating how confident and/or likely the image element belonging to one or more of the TOI categories. Under example scheme 400, the learning process for TOI detection may update category interest values based on user selections of images for storage and/or deletion. That is, as user selections may be a direct indication of user preference, user selections may affect recommendation of valuable images for storage by portable electronic apparatus 180 in the future. Moreover, the decision of valuableness may be determined in view of whether the overall interest value V exceeds a threshold value.

In the example shown in FIG. 4, example scheme 400 may pertain to TOI detection 410 of a video image 420 which may be a preview image. TOI detection 410 may include a first stage 430 of understanding of image content and a second stage 440 of evaluation of user interest. In first stage 430, example scheme 400 may involve portable electronic apparatus 180 identifying one or more elements in the content of video image 420, determining whether the one or more elements belong to any of one or more predefined categories (e.g., determining whether video image 420 contains one or more TOIs), and obtaining one or more respective confidence levels associated with the one or more predefined categories of the one or more TOIs. In the example shown in FIG. 4, portable electronic apparatus 180 may identify a number of elements and determine that these elements belong to the categories of "son", "son-smile", "my_dog", "my_dog-happy", "lake", "outdoor" and so on, each with an associated confidence level such as "conf_high", "conf_med" and "conf_low" for high, medium and low levels of confidence, respectively. Portable electronic apparatus 180 may also determine the location of each identified element in video image 420. For example, the element belonging to the "son" category may be at coordinates (x1, y1) in video image 420, the element belonging to the "my_dog" category may be at coordinates (x2, y2), and the element belonging to the "lake" category may be at coordinates (x3, y3).

In second stage 440, example scheme 400 may involve portable electronic apparatus 180 obtaining one or more respective interest values associated with the one or more predefined categories of the one or more TOIs. Example scheme 400 may also involve portable electronic apparatus 180 computing an overall user interest value regarding video image 420 based on the one or more interest values and the one or more confidence levels associated with the one or more predefined categories of the one or more TOIs. For example, example scheme 400 may involve portable electronic apparatus 180 computing an overall user interest value regarding video image 420 by adding multipliers of the one or more interest values and the one or more confidence levels associated with the one or more predefined categories of the one or more TOIs. Any formula involving the one or more interest values and the one or more confidence levels may be employed when they can reflect an overall user interest value. In the example shown in FIG. 4, portable electronic apparatus 180 may evaluate interest values associated with the one or more predefined categories of the TOIs in video image 420, with each category i having an evaluated category interest value $v_i$ and confidence level Portable electronic apparatus 180 may compute an overall user interest value V as the mathematical sum of $c_i \times v_i$. After first stage 430 and second stage 440, example scheme 400 may provide a decision 460, e.g., whether video image 420 is valuable, as well as an overall user interest value V associated with video image 420.

Example scheme 400 may also involve consideration of one or more additional factors in the evaluation of user interest in second stage 440. In the example shown in FIG. 4, one or more additional factors 450 may include, for example and not limited to, date/time of video image 420, location where video image 420 was taken, weather under which video image 420 was taken, and image quality of video image 420. In some implementations, under example scheme 400 any element detected in an image may enter second stage 440 for evaluation of user interest to determine the valuableness of the image.

An additional aspect of TOI detection in accordance with the present disclosure may include recommendation of images to the user. In some implementations, the recommendation may utilize predefined and/or user-defined categories. The ability to recognize image elements in an image may be trained and/or updated with publicly available information, e.g., from a server over a network. On the other hand, evaluation of user interest may only be trained or learned from user inputs, e.g., user selections of images for storage and/or deletion.

Another aspect of the TOI detection feature in accordance with the present disclosure may include providing, showing, displaying or otherwise presenting to the user the classification and/or label of one or more existing and/or new images based on categories of the one or more images, interest values and/or associated confidence levels. This may enable benefits such as ease of arrangement of images/photos, use of mosaic applications and year-end review of videos and or photo albums. Moreover, the TOI detection feature in accordance with the present disclosure may automatically delete unselected images a predefined or user-defined period of time, e.g., 10 minutes, after a user input of selection is received. Additionally, all temporarily-stored images may be deleted if no user input is received over a predefined or user-defined period of time. Furthermore, the TOI detection feature in accordance with the present disclosure may temporarily save or otherwise store all images after preview to allow the user to select from the automatically-saved images when the user enters an album of such images.

It is noteworthy that although implementations of the present disclosure are described in the detection of TOIs, techniques descried herein may also be utilized in detecting targets or elements that are not of interest and/or targets or elements of different type(s) in alternative implementations of the present disclosure.

Example Implementations

Figure 5:
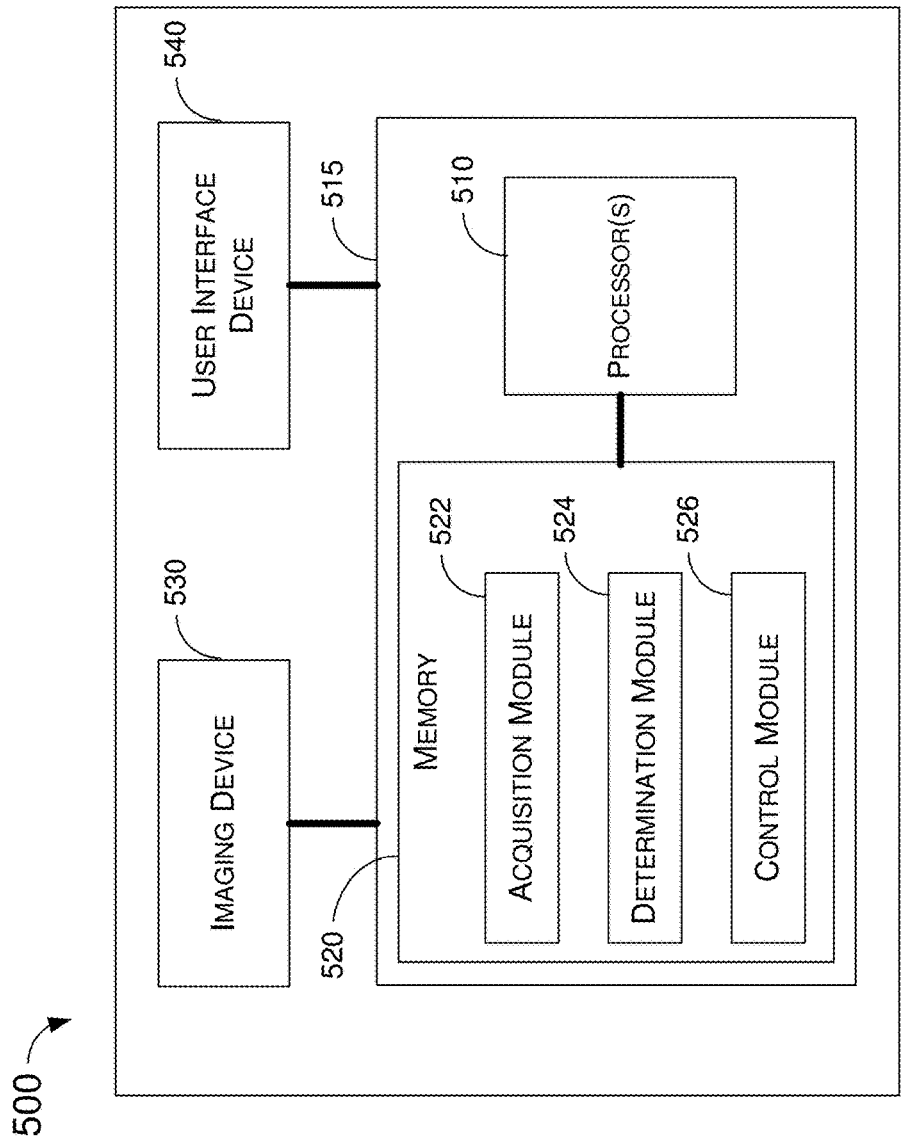
FIG. 5 is a block diagram of an example apparatus in accordance with an implementations of the present disclosure.

FIG. 5 illustrates an example apparatus 500 in accordance with an implementations of the present disclosure. Example apparatus 500 may perform various functions related to techniques, methods and systems described herein, including example processes 600, 700 and 800 described below. In some implementations, example apparatus 500 may be a portable electronic apparatus such as, for example, a smartphone, a computing device such as a tablet computer, a laptop computer, a notebook computer, a wearable device or the like, which is equipped with an imaging device, e.g., camera, capable of capturing still images and/or video images. Example apparatus 500 may be an implementation of portable electronic apparatus 180 in example environment 100.

Example apparatus 500 may include at least those components shown in FIG. 5, such as one or processors 510 and a memory device 520. In some implementations, the one or processors 510 and memory device 520 may be integral parts of a single integrated circuit (IC) chip 515 or a chipset, as shown in FIG. 5. Thus, in some implementations, example apparatus 500 may include IC chip 515 which includes one or more processors 510 and memory device 520. Alternatively, the one or processors 510 and memory device 520 may be discrete components separate from each other, e.g., each packaged in an individual chip.

In some implementations, as shown in FIG. 5, example apparatus 500 may additionally include an imaging device 530, e.g., a camera, capable of capturing still images and/or video images. In some implementations, as shown in FIG. 5, example apparatus 500 may further include a user interface device 540 which may include a display panel or screen, a touch-sensing panel, one or more speakers, a keyboard and/or one or more lights. User interface device 540 may be configured to provide one or more notifications indicative of existence of one or more valuable image. Alternatively or additionally, user interface device 540 may be configured to display representation(s) of the one or more valuable images, e.g., in the form of thumbnail images of the one or more valuable images.

Memory device 520 may be any type of random access memory (RAM) or any suitable memory device configured to store data and one or more sets of instructions which may be in the form of software, middleware or firmware modules. The modules stored in memory device 520 may be executable by one or more processors 510 to perform a number of operations. In the example shown in FIG. 5, memory device 520 may store therein an acquisition module 522, a determination module 524 and a control module 526 each of which executable by one or more processors 510.

Example apparatus 500 may operate in one of numerous operational modes. In some implementations, one of the operational modes of example apparatus 500 may be a preview mode and another one of the operational modes of example apparatus 500 may be capture mode, as described above with respect to example environment 100. In some implementations, the video images may include preview images generated when example apparatus 500 is operating in the preview mode.

Upon execution, acquisition module 522, determination module 524 and control module 526 may cause one or more processors 510 to perform a number of operations. For instance, acquisition module 522 may cause the one or more processors 510 to receive a stream of video images from imaging device 530. Additionally, determination module 524 may cause the one or more processors 510 to determine whether any image of the video images is valuable. Also, control module 526 may cause the one or more processors 510 to control an operation of one or more processors 510 in response to a result of the determination of whether any image of the video images is valuable.

Additionally or alternatively, acquisition module 522 may cause the one or more processors 510 to receive a stream of one or more preview images in a preview mode of example apparatus 500. Moreover, determination module 524 may cause the one or more processors 510 to determine whether any preview image of the stream of preview images is valuable. Furthermore, control module 526 may cause the one or more processors 510 to control an operation of the electronic apparatus in response to the determining. In an event that one or more preview images of the stream of one or more preview images are determined to be valuable, control module 526 may cause the one or more processors 510 to perform a number of operations. For instance, the one or more processors 510 may provide the one or more valuable preview images or one or more representatives thereof for selection by a user, e.g., user 170. In response to a selection of at least one of the one or more valuable preview images by the user, the one or more processors 510 may non-temporarily store the at least one selected valuable preview image of the one or more valuable preview images (e.g., by storing permanently or for more than a predefined duration of time such as 30 minutes, 1 hour, 1 day or another amount of time). Additionally, the one or more processors 510 may delete at least one non-selected valuable preview image of the one or more valuable preview images.

In some implementations, in controlling the operation of example apparatus 500 in response to the determining, the one or more processors 510 may be configured to temporarily store the one or more valuable preview images in response to the determining. Additionally or alternatively, in controlling the operation of example apparatus 500 in response to the determining, the one or more processors 510 may be configured to maintain an operation of example apparatus 500 in a preview mode without temporally storing any of the preview images in an event that no preview image of the stream of one or more preview images is determined to be valuable. Additionally or alternatively, the one or more processors 510 may be configured to temporarily store the one or more valuable preview images in the preview mode.

In some implementations, in controlling the operation of example apparatus 500 in response to the determining, the one or more processors 510 may be further configured to switch example apparatus 500 from the preview mode to a capture mode in which example apparatus 500 captures one or more images. Moreover, the one or more processors 510 may be configured to temporarily store the one or more valuable preview images in the capture mode. In some implementations, the one or more processors 510 may be additionally configured to receive one or more images when example apparatus 500 operates in the capture mode, where the one or more images are of a quality higher than a quality of the stream of one or more preview images received when example apparatus 500 operates in the preview mode. Additionally or alternatively, the one or more processors 510 may be further configured to trigger a video recording to record the one or more video images when example apparatus 500 operates in the capture mode. Additionally or alternatively, the one or more processors 510 may also be configured to determine whether any image in the video recording is valuable, and stop the video recording in response to a determination that no image among a predetermined number of images in the video recording is valuable.

In some implementations, in providing the one or more valuable preview images or the one or more representatives thereof for selection by the user, the one or more processors 510 may be configured to provide a notification indicative of an existence of the one or more valuable preview image, display a representation of the one or more valuable preview images, or perform both of the aforementioned actions. In some implementations, in determining whether any image in the video recording is valuable, the one or more processors 510 may be configured to obtain a respective value of user level of interest for each of the one or more video images. Moreover, in displaying the representation of the one or more valuable preview images, the one or more processors 510 may be configured to display the one or more valuable preview images in a sorted order according to the respective values of user level of interest associated with the one or more valuable preview images.

In some implementations, in providing the one or more valuable preview images or the one or more representatives thereof for selection by the user, the one or more processors 510 may be further configured to determine whether an input is received. The input may be indicative of a selection of at least one image of the one or more valuable preview images for non-temporary storage. In some implementations, the one or more processors 510 may be further configured to delete the one or more valuable preview images in response to a determination that no input is received.

In some implementations, in determining whether any preview image of the stream of preview images is valuable, the one or more processors 510 may be configured to perform a number of operations. For instance, the one or more processors 510 detect that a preview image of the stream of preview images contains one or more target of interests (TOIs). Additionally, the one or more processors 510 may evaluate a user level of interest in the preview image. Furthermore, the one or more processors 510 determine that the preview image is valuable according to at least a value of the evaluated user level of interest in the preview image.

In some implementations, in detecting that the preview image of the stream of preview images contains the one or more TOIs, the one or more processors 510 may be configured to perform a number of operations. For instance, the one or more processors 510 may identify one or more elements in a content of the preview image. The one or more processors 510 may also determine whether the one or more elements belong to any of one or more predefined categories to obtain the one or more TOIs. The one or more processors 510 may further obtain one or more respective confidence levels associated with the one or more predefined categories of the one or more TOIs. In some implementations, the one or more processors 510 may be further configured to receive a user input that defines the one or more predefined categories.

In some implementations, in evaluating the user level of interest in the preview image, the one or more processors 510 may be configured to perform a number of operations. For instance, the one or more processors 510 may obtain one or more respective interest values associated with the one or more predefined categories of the one or more TOIs. The one or more processors 510 may compute an overall user interest value regarding the image according to the one or more interest values and the one or more confidence levels associated with the one or more predefined categories of the one or more TOIs. The one or more processors 510 may further set the value of the evaluated user level of interest in the preview image based on the overall user interest value regarding the preview image.

In some implementations, the one or more processors 510 may be further configured to perform a number of operations. For instance, the one or more processors 510 may receive a user input indicative of a selection from one or more valuable preview images of the stream of one or more preview images. Moreover, the one or more processors 510 may update at least one interest value associated with at least one of the one or more predefined categories according to the selection.

Additionally or alternatively, the one or more processors 510 may be further configured to perform a number of operations. For instance, the one or more processors 510 may maintain a record of one or more criteria for use in the evaluating of the user level of interest in the preview image.

In particular, the one or more processors 510 may perform at least one of the following: (1) receiving a first user input indicative of a user preference, (2) receiving information about configuration settings, (3) identifying and recording a user selection of one or more preview images of the stream of one or more preview images, (4) identifying and recording one or more patterns in one or more offline photo albums, (5) identifying and recording one or more patterns in one or more online albums, (6) identifying and recording a user preference of images on one or more social networks, and (7) identifying and recording personal information contained in an online user profile.

In some implementations, in determining whether any preview image of the stream of one or more preview images is valuable, the one or more processors 510 may be configured to perform a number of operations. For instance, the one or more processors 510 may identify one or more elements in a first preview image as belonging to one or more predefined categories. Additionally, the one or more processors 510 may evaluate whether the first preview image as being valuable based on the one or more predefined categories.

Additionally or alternatively, in determining whether any preview image of the stream of one or more preview images is valuable, the one or more processors 510 may be configured to determine a preview image of the stream of one or more preview images is valuable when the preview image contains one or more target of interests (TOIs) and is evaluated to have an overall user interest value higher than a threshold value.

In some implementations, in controlling the operation of one or more processors 510 in response to the determining, control module 526 may cause the one or more processors 510 to maintain an operation thereof in the preview mode in an event that no image of the video images is determined to be valuable.

In some implementations, in controlling the operation of one or more processors 510 in response to the determining, control module 526 may cause the one or more processors 510 to store in memory device 520 at least temporarily one or more valuable images of the video images in response to the determining.

In some implementations, in controlling the operation of one or more processors 510 in response to the determining, control module 526 may cause the one or more processors 510 to perform either or both of the following: providing a notification indicative of an existence of the one or more valuable image and displaying a representation of the one or more valuable images.

In some implementations, in determining whether any image of the video images is valuable, determination module 524 may cause the one or more processors 510 to obtain a respective value of user level of interest for each of the one or more video images. Moreover, in displaying the representation of the one or more valuable images, control module 526 may cause the one or more processors 510 to display, via user interface device 540, the one or more valuable images in a sorted order according to the respective values of user level of interest associated with the one or more valuable images.

In some implementations, in controlling the operation of one or more processors 510 in response to the determining, control module 526 may cause the one or more processors 510 to determine whether an input is received, the input indicative of a selection of at least one image of the one or more valuable images for non-temporary storage. Additionally, control module 526 may cause the one or more processors 510 to perform at least one of the following: non-temporarily storing at least one selected image of the one or more valuable images in an album in response to a determination that the input is received; deleting at least one non-selected image other than the at least one selected image of the one or more valuable images; and deleting the one or more valuable images in response to a determination that no input is received.

In some implementations, in controlling the operation of one or more processors 510 in response to the determining, control module 526 may cause the one or more processors 510 to trigger a video recording by imaging device 530 in response to a determination that at least one of the video images is valuable.

In some implementations, determination module 524 may also cause the one or more processors 510 to determine whether any image in the video recording is valuable. Additionally, control module 526 may also cause the one or more processors 510 to stop the video recording in response to a determination that no image among a predetermined number of images in the video recording is valuable.

In some implementations, in receiving the stream of video images, acquisition module 522 may cause the one or more processors 510 to receive the stream of video images from imaging device 530 when imaging device 530 operates in a first mode in which imaging device 530 captures images by a first quality. Imaging device 530 may be configured to operate in at least the first mode or a second mode. In the second mode, imaging device 530 may capture images by a second quality higher than the first quality. In some implementations, control module 526 may cause the one or more processors 510 to switch imaging device 530 to operate in the second mode in response to a determination that a first image of the video images is valuable and to trigger image capturing by imaging device 530 in the second mode.

In some implementations, in determining whether any image of the video images is valuable, determination module 524 may cause the one or more processors 510 to detect that an image of the video images contains one or more TOIs. Determination module 524 may also cause the one or more processors 510 to evaluate a user level of interest in the image and determine that the image is valuable according at least to a value of the evaluated user level of interest in the image.

In some implementations, in detecting that the image contains the one or more TOIs, determination module 524 may cause the one or more processors 510 to identify one or more elements in a content of the image and determine whether the one or more elements belong to any of one or more predefined categories to obtain the one or more TOIs. Determination module 524 may also cause the one or more processors 510 to obtain one or more respective confidence levels associated with the one or more predefined categories of the one or more TOIs. In some implementations, acquisition module 522 may also cause the one or more processors 510 to receive a user input that defines the one or more predefined categories.

In some implementations, in evaluating the user level of interest in the image, determination module 524 may cause the one or more processors 510 to obtain one or more respective interest values associated with the one or more predefined categories of the one or more TOIs. Determination module 524 may also cause the one or more processors 510 to compute an overall user interest value regarding the image by adding multipliers of the one or more interest values and the one or more confidence levels associated with the one or more predefined categories of the one or more TOIs. Determination module 524 may also cause the one or more processors 510 to set the value of the evaluated user level of interest in the image based on the overall user interest value regarding the image.

Additionally, acquisition module 522 may further cause the one or more processors 510 to receive a user input indicative of a selection from one or more valuable images of the one or more video images. Control module 526 may further cause the one or more processors 510 to update at least one interest value associated with at least one of the one or more predefined categories according to the selection.

In some implementations, control module 526 may additionally cause the one or more processors 510 to maintain a record of one or more criteria for use in the evaluating of a user level of interest in the image by performing at least one of the following: receiving a first user input indicative of a user preference, receiving a second user input that configures settings, identifying and recording a user selection of one or more images of the video images, identifying and recording one or more patterns in one or more offline photo albums, identifying and recording one or more patterns in one or more online albums, identifying and recording a user preference of images on one or more social networks, and identifying and recording personal information contained in an online user profile.

In some implementations, in determining whether any image of the video images is valuable, determination module 524 may cause the one or more processors 510 to identify one or more elements in a first image as belonging to one or more predefined categories, and to evaluate whether the first image as being valuable based on the one or more predefined categories.

In some implementations, in determining whether any image of the video images is valuable, determination module 524 may cause the one or more processors 510 to determine an image of the video images is valuable when the image contains one or more TOIs and is evaluated to have an overall user interest value higher than a threshold value.

Figure 6:
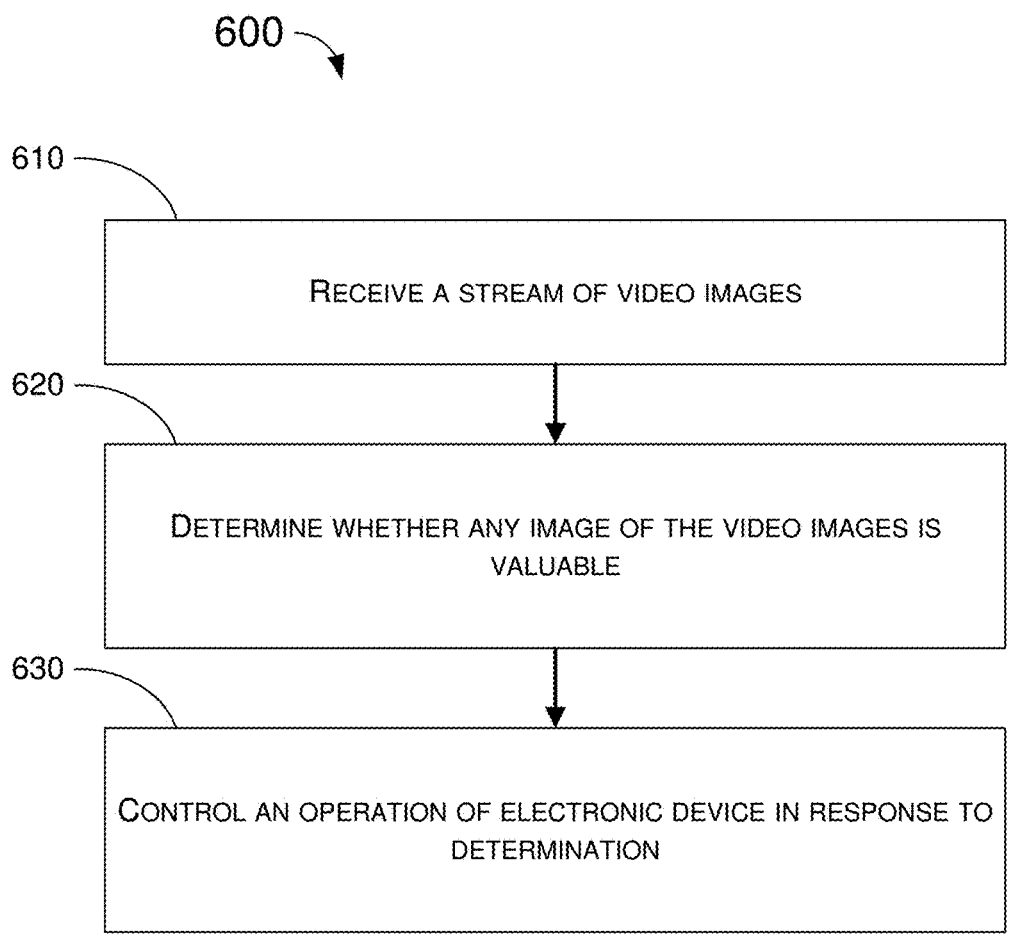
FIG. 6 is a flowchart of an example process in accordance with an implementation of the present disclosure.

FIG. 6 illustrates an example process 600 in accordance with an implementation of the present disclosure. Example process 600 may include one or more operations, actions, or functions as represented by one or more of blocks 610, 620 and 630. Although illustrated as discrete blocks, various blocks of example process 600 may be divided into additional blocks, combined into fewer blocks, or eliminated, depending on the desired implementation. Example process 600 may be implemented by portable electronic apparatus 180 in example environment 100 and/or the one or more processors 510 of example apparatus 500. For illustrative purposes, operations of example process 600 are described below in the context of being performed by portable electronic apparatus 180 of example environment 100. Example process 600 may begin at block 610.

Block 610 may involve portable electronic apparatus 180 receiving a stream of video images. Block 610 may be followed by block 620.

Block 620 may involve portable electronic apparatus 180 determining whether any image of the video images is valuable. Block 620 may be followed by block 630.

Block 630 may involve portable electronic apparatus 180 controlling an operation thereof in response to the determining.

In some implementations, the video images may include preview images generated when electronic apparatus 180 is operating in a preview mode.

In some implementations, in controlling the operation of electronic apparatus 180 in response to the determining, example process 600 may involve portable electronic apparatus 180 maintaining an operation of electronic apparatus 180 in a preview mode in an event that no image of the video images is determined to be valuable.

In some implementations, in controlling the operation electronic apparatus 180 in response to the determining, example process 600 may involve portable electronic apparatus 180 storing at least temporarily one or more valuable images of the video images in response to the determining.

In some implementations, in controlling the operation of electronic apparatus 180 in response to the determining, example process 600 may further involve portable electronic apparatus 180 performing either or both of providing a notification indicative of an existence of the one or more valuable image and displaying a representation of the one or more valuable images.

In some implementations, in determining whether any image of the video images is valuable, example process 600 may involve portable electronic apparatus 180 obtaining a respective value of user level of interest for each of the one or more video images. Moreover, in displaying the representation of the one or more valuable images, example process 600 may involve portable electronic apparatus 180 displaying the one or more valuable images in a sorted order according to the respective values of user level of interest associated with the one or more valuable images.

In some implementations, in controlling the operation of electronic apparatus 180 in response to the determining, example process 600 may further involve portable electronic apparatus 180 determining whether an input is received, the input indicative of a selection of at least one image of the one or more valuable images for non-temporary storage. Example process 600 may additionally involve portable electronic apparatus 180 performing at least one of a number of operations. For instance, example process 600 may involve portable electronic apparatus 180 non-temporarily storing at least one selected image of the one or more valuable images in an album in response to a determination that the input is received. Alternatively or additionally, example process 600 may involve portable electronic apparatus 180 deleting at least one non-selected image other than the at least one selected image of the one or more valuable images. Still alternatively or additionally, example process 600 may involve portable electronic apparatus 180 deleting the one or more valuable images in response to a determination that no input is received.

In some implementations, in controlling the operation of electronic apparatus 180 in response to the determining, example process 600 may involve portable electronic apparatus 180 triggering a video recording by an imaging device in response to a determination that at least one of the video images is valuable. Additionally, example process 600 may involve portable electronic apparatus 180 determining whether any image in the video recording is valuable. Example process 600 may also involve portable electronic apparatus 180 stopping the video recording in response to a determination that no image among a predetermined number of images in the video recording is valuable.

In some implementations, in receiving the stream of video images, example process 600 may involve portable electronic apparatus 180 receiving the stream of video images from an imaging device when the imaging device operates in a first mode in which the imaging device captures images by a first quality. The imaging device may be configured to operate in at least the first mode or a second mode in which the imaging device captures images by a second quality higher than the first quality.

In some implementations, example process 600 may further involve portable electronic apparatus 180 switching the imaging device to operate in the second mode in response to a determination that a first image of the video images is valuable. Example process 600 may also involve portable electronic apparatus 180 triggering image capturing by the imaging device in the second mode.

In some implementations, in determining whether any image of the video images is valuable, example process 600 may further involve portable electronic apparatus 180 detecting that an image of the video images contains one or more TOIs, evaluating a user level of interest in the image, and determining that the image is valuable according at least to a value of the evaluated user level of interest in the image.

In some implementations, in detecting that the image contains the one or more TOIs, example process 600 may involve portable electronic apparatus 180 identifying one or more elements in a content of the image and determining whether the one or more elements belong to any of one or more predefined categories to obtain the one or more TOIs. Example process 600 may further involve portable electronic apparatus 180 obtaining one or more respective confidence levels associated with the one or more predefined categories of the one or more TOIs. Each confidence level may be indicative of a degree of likelihood that a respective element of the one or more elements belongs to one or more categories of the TOIs. In some implementations, example process 600 may further involve portable electronic apparatus 180 receiving a user input that defines the one or more predefined categories.

In some implementations, in evaluating the user level of interest in the image, example process 600 may involve portable electronic apparatus 180 obtaining one or more respective interest values associated with the one or more predefined categories of the one or more TOIs. Example process 600 may also involve portable electronic apparatus 180 computing an overall user interest value regarding the image by adding multipliers of the one or more interest values and the one or more confidence levels associated with the one or more predefined categories of the one or more TOIs. Example process 600 may further involve portable electronic apparatus 180 setting the value of the evaluated user level of interest in the image based on the overall user interest value regarding the image.

In some implementations, example process 600 may further involve portable electronic apparatus 180 receiving a user input indicative of a selection from one or more valuable images of the one or more video images. Additionally, example process 600 may involve portable electronic apparatus 180 updating at least one interest value associated with at least one of the one or more predefined categories according to the selection.

In some implementations, example process 600 may further involve portable electronic apparatus 180 maintaining a record of one or more criteria for use in the evaluating of a user level of interest in the image by performing at least one of the following: receiving a first user input indicative of a user preference, receiving a second user input that configures settings, identifying and recording a user selection of one or more images of the video images, identifying and recording one or more patterns in one or more offline photo albums, identifying and recording one or more patterns in one or more online albums, identifying and recording a user preference of images on one or more social networks, and identifying and recording personal information contained in an online user profile.

In some implementations, in determining whether any image of the video images is valuable, example process 600 may involve portable electronic apparatus 180 identifying one or more elements in a first image as belonging to one or more predefined categories and evaluating whether the first image as being valuable based on the one or more predefined categories.

In some implementations, in determining whether any image of the video images is valuable, example process 600 may involve portable electronic apparatus 180 determining an image of the video images is valuable when the image contains one or more TOIs and is evaluated to have an overall user interest value higher than a threshold value.

Figure 7:
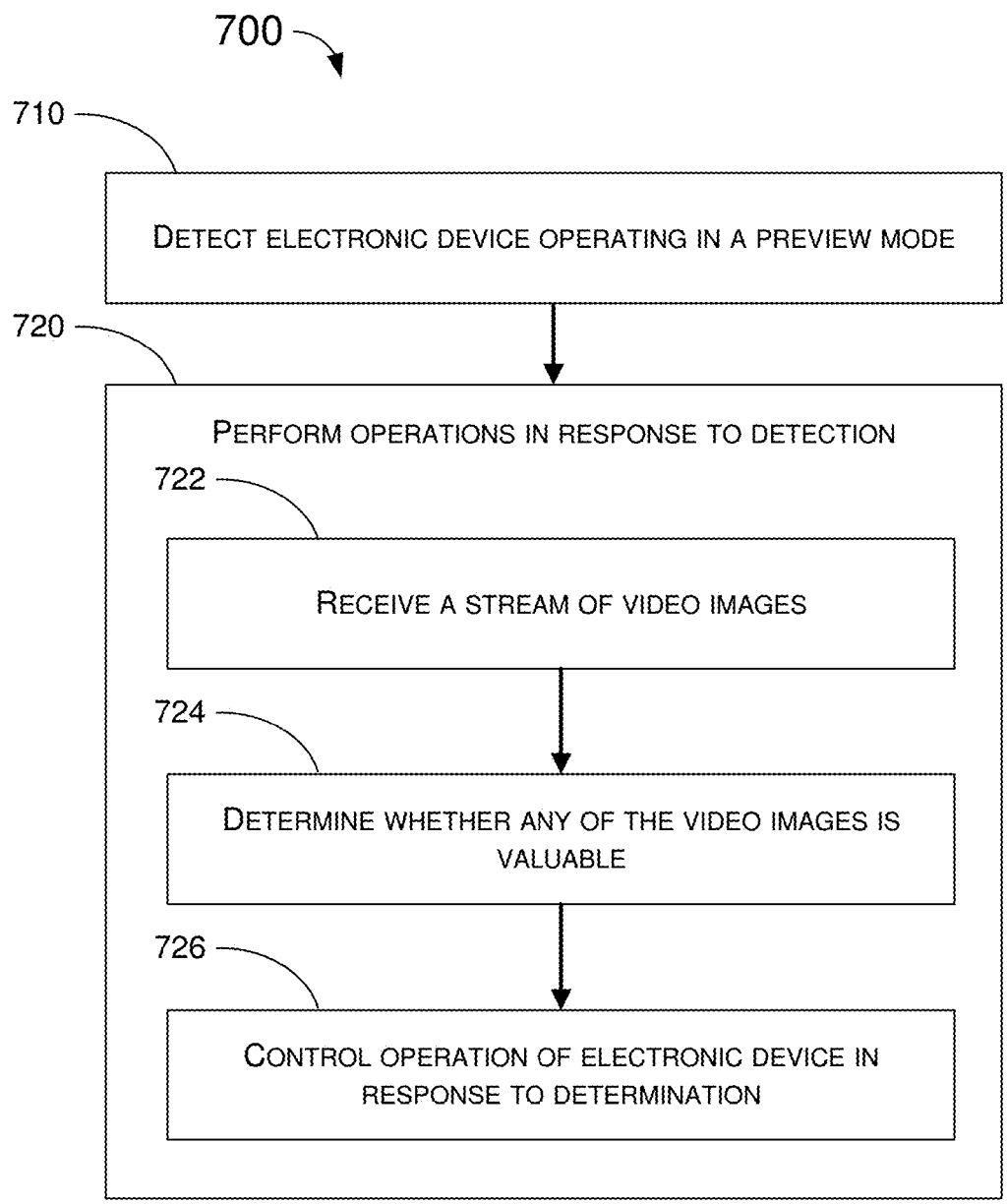
FIG. 7 is a flowchart of an example process in accordance with another implementation of the present disclosure.

FIG. 7 illustrates an example process 700 in accordance with an implementation of the present disclosure. Example process 700 may include one or more operations, actions, or functions as represented by one or more of blocks 710 and 720 as well as sub-blocks 722, 724 and 726. Although illustrated as discrete blocks, various blocks of example process 700 may be divided into additional blocks, combined into fewer blocks, or eliminated, depending on the desired implementation. Example process 700 may be implemented by portable electronic apparatus 180 in example environment 100 and/or the one or more processors 510 of example apparatus 500. For illustrative purposes, operations of example process 700 are described below in the context of being performed by the one or more processors 510 of example apparatus 500. Example process 700 may begin at block 710.

Block 710 may involve one or more processors 510 detecting that example apparatus 500 operates in a preview mode. Block 710 may be followed by block 720.

Block 720 may involve one or more processors 510 performing a number of operations as represented by sub-blocks 722, 724 and 726.

Sub-block 722 may involve one or more processors 510 receiving from imaging device 530 a stream of video images. Sub-block 722 may be followed by sub-block 724.

Sub-block 724 may involve one or more processors 510 determining whether any of the video images is valuable. Sub-block 724 may be followed by sub-block 726.

Sub-block 726 may involve one or more processors 510 controlling an operation of example apparatus 500 in response to the determining.

In some implementations, in controlling the operation of example apparatus 500 in response to the determining, example process 700 may involve one or more processors 510 maintaining the operation of example apparatus 500 in a preview mode in an event that no image of the video images is determined to be valuable.

In some implementations, in controlling the operation of example apparatus 500 in response to the determining, example process 700 may involve one or more processors 510 storing at least temporarily one or more valuable images of the video images in response to the determining.

In some implementations, in controlling the operation of example apparatus 500 in response to the determining, example process 700 may also involve one or more processors 510 performing either or both of the following: providing a notification indicative of an existence of the one or more valuable image and displaying a representation of the one or more valuable images.

In some implementations, in determining whether any image of the video images is valuable, example process 700 may involve one or more processors 510 obtaining a respective value of user level of interest for each of the one or more video images, Moreover, in displaying the representation of the one or more valuable images, example process 700 may involve one or more processors 510 causing imaging device 530 to display the one or more valuable images in a sorted order according to the respective values of user level of interest associated with the one or more valuable images.

In some implementations, in controlling the operation of example apparatus 500 in response to the determining, example process 700 may further involve one or more processors 510 determining whether an input is received, the input indicative of a selection of at least one image of the one or more valuable images for non-temporary storage. Example process 700 may also involve one or more processors 510 non-temporarily storing at least one selected image of the one or more valuable images in an album in response to a determination that the input is received. Alternatively or additionally, example process 700 may involve one or more processors 510 deleting at least one non-selected image other than the at least one selected image of the one or more valuable images. Still alternatively or additionally, example process 700 may involve one or more processors 510 deleting the one or more valuable images in response to a determination that no input is received.

In some implementations, in controlling the operation of example apparatus 500 in response to the determining, example process 700 may involve one or more processors 510 triggering a video recording by imaging device 530 in response to a determination that at least one of the video images is valuable.

In some implementations, example process 700 may further involve one or more processors 510 determining whether any image in the video recording is valuable. Example process 700 may also involve one or more processors 510 stopping the video recording in response to a determination that no image among a predetermined number of images in the video recording is valuable.

In some implementations, in receiving the stream of video images, example process 700 may involve one or more processors 510 receiving the stream of video images from imaging device 530 associated with example apparatus 500 when imaging device 530 operates in a first mode in which imaging device 530 captures images by a first quality. Imaging device 530 may be configured to operate in at least the first mode or a second mode in which imaging device 530 captures images by a second quality higher than the first quality.

In some implementations, example process 700 may further involve one or more processors 510 switching imaging device 530 to operate in the second mode in response to a determination that a first image of the video images is valuable. Example process 700 may also involve one or more processors 510 triggering image capturing by imaging device 530 in the second mode.

In some implementations, in determining whether any image of the video images is valuable, example process 700 may involve one or more processors 510 detecting that an image of the video images contains one or more TOIs. Example process 700 may also involve one or more processors 510 evaluating a user level of interest in the image. Example process 700 may additionally involve one or more processors 510 determining that the image is valuable according at least to a value of the evaluated user level of interest in the image.

In some implementations, in detecting that the image contains the one or more TOIs, example process 700 may involve one or more processors 510 identifying one or more elements in a content of the image and determining whether the one or more elements belong to any of one or more predefined categories to obtain the one or more TOIs. Example process 700 may also involve one or more processors 510 obtaining one or more respective confidence levels associated with the one or more predefined categories of the one or more TOIs. Each confidence level may be indicative of a degree of likelihood that a respective element of the one or more elements belongs to one or more categories of the TOIs.

In some implementations, example process 700 may further involve one or more processors 510 receiving a user input that defines the one or more predefined categories.

In some implementations, in evaluating the user level of interest in the image, example process 700 may involve one or more processors 510 obtaining one or more respective interest values associated with the one or more predefined categories of the one or more TOIs. Example process 700 may further involve one or more processors 510 computing an overall user interest value regarding the image based on the one or more interest values and the one or more confidence levels associated with the one or more predefined categories of the one or more TOIs. For example, example process 700 may further involve one or more processors 510 computing an overall user interest value regarding the image by adding multipliers of the one or more interest values and the one or more confidence levels associated with the one or more predefined categories of the one or more TOIs. Other formula involving the one or more interest values and the one or more confidence levels associated with the one or more predefined categories of the one or more TOIs may also employed. Example process 700 may also involve one or more processors 510 setting the value of the evaluated user level of interest in the image based on the overall user interest value regarding the image.

In some implementations, example process 700 may further involve one or more processors 510 receiving a user input indicative of a selection from one or more valuable images of the one or more video images. Example process 700 may also involve one or more processors 510 updating at least one interest value associated with at least one of the one or more predefined categories according to the selection.

In some implementations, example process 700 may further involve one or more processors 510 maintaining a record of one or more criteria for use in the evaluating of a user level of interest in the image by performing at least one of the following: receiving a first user input indicative of a user preference, receiving a second user input that configures settings, identifying and recording a user selection of one or more images of the video images, identifying and recording one or more patterns in one or more offline photo albums, identifying and recording one or more patterns in one or more online albums, identifying and recording a user preference of images on one or more social networks, and identifying and recording personal information contained in an online user profile.

In some implementations, in determining whether any image of the video images is valuable, example process 700 may involve one or more processors 510 identifying one or more elements in a first image as belonging to one or more predefined categories. Example process 700 may also involve one or more processors 510 evaluating whether the first image as being valuable based on the one or more predefined categories.

In some implementations, in determining whether any image of the video images is valuable, example process 700 may involve one or more processors 510 determining an image of the video images is valuable when the image contains one or more TOIs and is evaluated to have an overall user interest value higher than a threshold value.

Figure 8:
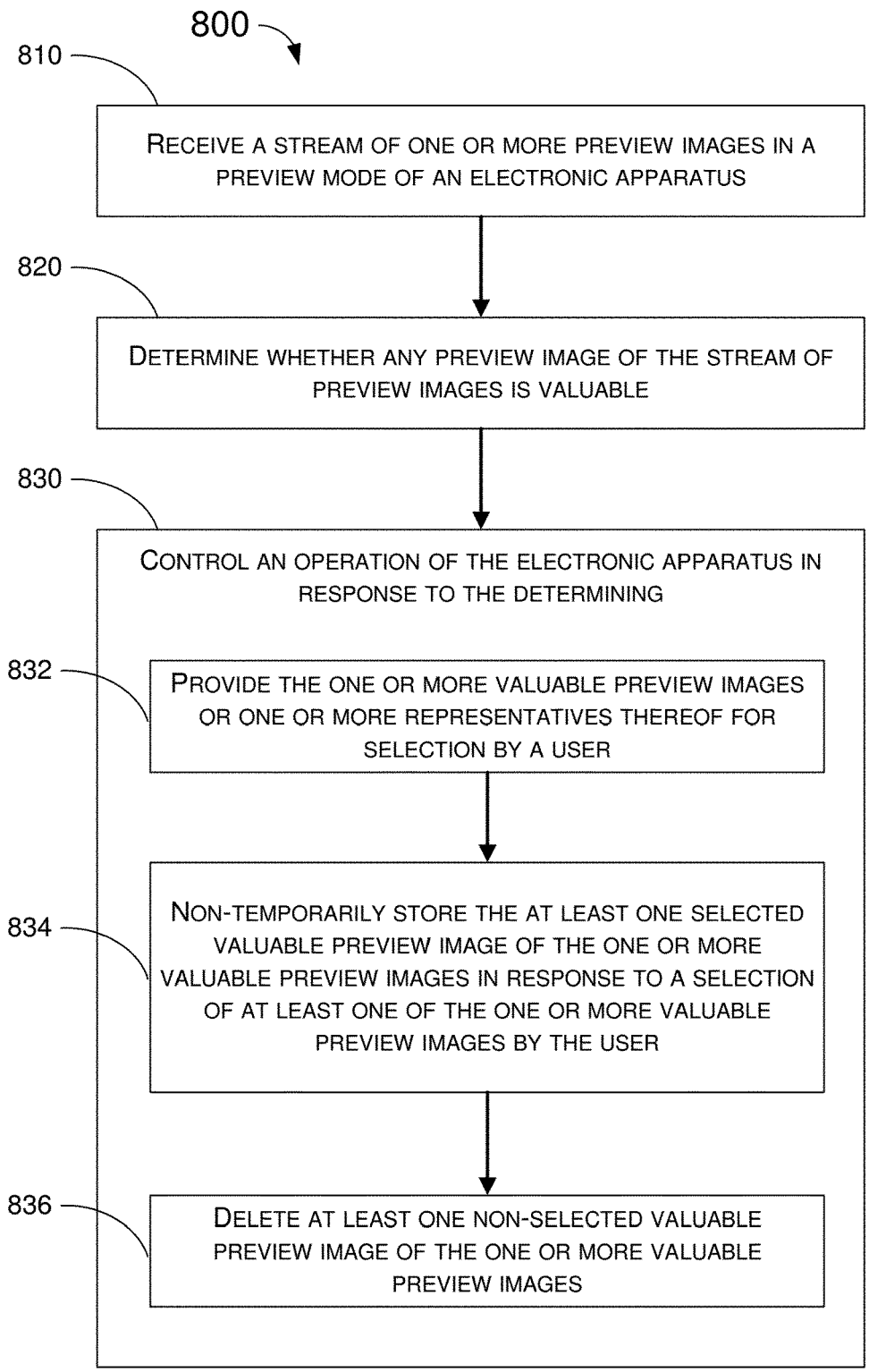
FIG. 8 is a flowchart of an example process in accordance with yet another implementation of the present disclosure.

FIG. 8 illustrates an example process 800 in accordance with an implementation of the present disclosure. Example process 800 may include one or more operations, actions, or functions as represented by one or more of blocks 810, 820 and 830 as well as sub-blocks 832, 834 and 836. Although illustrated as discrete blocks, various blocks of example process 800 may be divided into additional blocks, combined into fewer blocks, or eliminated, depending on the desired implementation. Example process 800 may be implemented by portable electronic apparatus 180 in example environment 100 and/or the one or more processors 510 of example apparatus 500. For illustrative purposes, operations of example process 800 are described below in the context of being performed by the one or more processors 510 of example apparatus 500. Example process 800 may begin at block 810.

At block 810, example process 800 may involve the one or more processors 510 receiving a stream of one or more preview images in a preview mode of example apparatus 500. Block 810 may be followed by block 820.

At block 820, example process 800 may involve the one or more processors 510 determining whether any preview image of the stream of preview images is valuable. Block 820 may be followed by block 830.

At block 830, example process 800 may involve the one or more processors 510 controlling an operation of example apparatus 500 in response to the determining. In an event that one or more preview images of the stream of one or more preview images are determined to be valuable, example process 800 may involve the one or more processors 510 performing a number of operations as represented by sub-blocks 832, 834 and 836.

At sub-block 832, example process 800 may involve the one or more processors 510 providing the one or more valuable preview images or one or more representatives thereof for selection by a user, e.g., user 170. Sub-block 832 may be followed by sub-block 834.

At sub-block 834, example process 800 may involve the one or more processors 510 non-temporarily storing the at least one selected valuable preview image of the one or more valuable preview images in response to a selection of at least one of the one or more valuable preview images by the user. Sub-block 834 may be followed by sub-block 836.

At sub-block 834, example process 800 may involve the one or more processors 510 deleting at least one non-selected valuable preview image of the one or more valuable preview images.

In some implementations, in controlling the operation of example apparatus 500 in response to the determining, example process 800 may involve the one or more processors 510 temporarily storing the one or more valuable preview images in response to the determining. Additionally or alternatively, in controlling the operation of example apparatus 500 in response to the determining, example process 800 may involve the one or more processors 510 maintaining an operation of example apparatus 500 in a preview mode without temporally storing any of the preview images in an event that no preview image of the stream of one or more preview images is determined to be valuable. The temporarily storing of the one or more valuable preview images may be performed in the preview mode. Additionally or alternatively, in controlling the operation of example apparatus 500 in response to the determining, example process 800 may involve the one or more processors 510 switching example apparatus 500 from the preview mode to a capture mode in which example apparatus 500 captures one or more images. Again, the temporarily storing of the one or more valuable preview images may be performed in the capture mode. In addition, example process 800 may involve the one or more processors 510 receiving one or more images when example apparatus 500 operates in the capture mode, the one or more images having a quality higher than a quality of the stream of one or more preview images received when example apparatus 500 operates in the preview mode.

In some implementations, example process 800 may also involve the one or more processors 510 triggering a video recording to record the one or more video images when example apparatus 500 operates in the capture mode. Moreover, example process 800 may involve the one or more processors 510 determining whether any image in the video recording is valuable. Furthermore, example process 800 may involve the one or more processors 510 stopping the video recording in response to a determination that no image among a predetermined number of images in the video recording is valuable.

In some implementations, in providing the one or more valuable preview images or the one or more representatives thereof for selection by the user, example process 800 may also involve the one or more processors 510 providing a notification indicative of an existence of the one or more valuable preview image, displaying a representation of the one or more valuable preview images, or performing both of the aforementioned actions. In some implementations, in determining whether any image in the video recording is valuable, example process 800 may also involve the one or more processors 510 obtaining a respective value of user level of interest for each of the one or more video images. Moreover, in displaying the representation of the one or more valuable preview images, example process 800 may also involve the one or more processors 510 displaying the one or more valuable preview images in a sorted order according to the respective values of user level of interest associated with the one or more valuable preview images.

In some implementations, in providing the one or more valuable preview images or the one or more representatives thereof for selection by the user, example process 800 may further involve the one or more processors 510 determining whether an input is received. The input may be indicative of a selection of at least one image of the one or more valuable preview images for non-temporary storage. Additionally, example process 800 may also involve the one or more processors 510 deleting the one or more valuable preview images in response to a determination that no input is received.

In some implementations, in determining whether any preview image of the stream of preview images is valuable, example process 800 may involve the one or more processors 510 performing a number of operations. For instance, example process 800 may involve the one or more processors 510 detecting that a preview image of the stream of preview images contains one or more TOIs. Additionally, example process 800 may involve the one or more processors 510 evaluating a user level of interest in the preview image. Furthermore, example process 800 may involve the one or more processors 510 determining that the preview image is valuable according to at least a value of the evaluated user level of interest in the preview image.

In some implementations, in detecting that the preview image of the stream of preview images contains the one or more TOIs, example process 800 may involve the one or more processors 510 performing a number of operations.

For instance, example process 800 may involve the one or more processors 510 identifying one or more elements in a content of the preview image. Additionally, example process 800 may involve the one or more processors 510 determining whether the one or more elements belong to any of one or more predefined categories to obtain the one or more TOIs. Furthermore, example process 800 may involve the one or more processors 510 obtaining one or more respective confidence levels associated with the one or more predefined categories of the one or more TOIs. Each confidence level may be indicative of a degree of likelihood that a respective element of the one or more elements belongs to one or more categories of the TOIs. In some implementations, example process 800 may also involve the one or more processors 510 receiving a user input that defines the one or more predefined categories.

In some implementations, in evaluating the user level of interest in the preview image, example process 800 may involve the one or more processors 510 performing a number of operations. For instance, example process 800 may involve the one or more processors 510 obtaining one or more respective interest values associated with the one or more predefined categories of the one or more TOIs. Additionally, example process 800 may involve the one or more processors 510 computing an overall user interest value regarding the image according to the one or more interest values and the one or more confidence levels associated with the one or more predefined categories of the one or more TOIs. Furthermore, example process 800 may involve the one or more processors 510 setting the value of the evaluated user level of interest in the preview image based on the overall user interest value regarding the preview image. Additionally, example process 800 may involve the one or more processors 510 receiving a user input indicative of a selection from one or more valuable preview images of the stream of one or more preview images. Moreover, example process 800 may involve the one or more processors 510 updating at least one interest value associated with at least one of the one or more predefined categories according to the selection.

In some implementations, example process 800 may involve the one or more processors 510 maintaining a record of one or more criteria for use in the evaluating of the user level of interest in the preview image by performing at least one of the following operations: (1) receiving a first user input indicative of a user preference, (2) receiving information about configuration settings, (3) identifying and recording a user selection of one or more preview images of the stream of one or more preview images, (4) identifying and recording one or more patterns in one or more offline photo albums, (5) identifying and recording one or more patterns in one or more online albums, (6) identifying and recording a user preference of images on one or more social networks, and (7) identifying and recording personal information contained in an online user profile.

In some implementations, in determining whether any preview image of the stream of one or more preview images is valuable, example process 800 may involve the one or more processors 510 identifying one or more elements in a first preview image as belonging to one or more predefined categories. Additionally, example process 800 may involve the one or more processors 510 evaluating whether the first preview image as being valuable based on the one or more predefined categories.

Additionally or alternatively, in determining whether any preview image of the stream of one or more preview images is valuable, example process 800 may involve the one or more processors 510 determining a preview image of the stream of one or more preview images is valuable when the preview image contains one or more TOIs and is evaluated to have an overall user interest value higher than a threshold value.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for operating an electronic apparatus, comprising:
    receiving a stream of one or more preview images in a preview mode of the electronic apparatus;
    determining whether any preview image of the stream of preview images is valuable by determining whether each of the preview images contains a target of interest (TOI) and evaluating a respective user level of interest; and
    controlling an operation of the electronic apparatus in response to the determining, wherein the controlling comprises, in an event that one or more preview images of the stream of one or more preview images are determined to be valuable, performing operations comprising:
        providing the one or more valuable preview images or one or more representatives thereof for selection by a user;
        in response to a selection of at least one of the one or more valuable preview images by the user, non-temporarily storing the at least one selected valuable preview image of the one or more valuable preview images;
        deleting at least one non-selected valuable preview image of the one or more valuable preview images; and
        switching the electronic apparatus from the preview mode to a capture mode; and
        capturing a stream of images in the capture mode such that a quality of the images captured in the capture mode is better than a quality of the one or more preview images.

2. The method of claim 1, wherein the controlling of the operation of the electronic apparatus in response to the determining comprise temporarily storing the one or more valuable preview images in response to the determining.

3. The method of claim 2, wherein the controlling of the operation of the electronic apparatus in response to the determining comprises, in an event that no preview image of the stream of one or more preview images is determined to be valuable, maintaining an operation of the electronic apparatus in a preview mode without temporally storing any of the preview images.

4. The method of claim 2, wherein the temporarily storing of the one or more valuable preview images is performed in the preview mode.

5. The method of claim 2, wherein the controlling of the operation of the electronic apparatus in response to the determining further comprises switching the electronic apparatus from the preview mode to a capture mode in which the electronic apparatus captures one or more images, and wherein the temporarily storing of the one or more valuable preview images is performed in the capture mode.

6. The method of claim 5, further comprising triggering a video recording to record one or more video images when the electronic apparatus operates in the capture mode.

7. The method of claim 6, further comprising:
determining whether any image in the video recording is valuable; and
stopping the video recording in response to a determination that no image among a predetermined number of images in the video recording is valuable.

8. The method of claim 1, wherein the providing of the one or more valuable preview images or the one or more representatives thereof for selection by the user comprises:
performing either or both of:
providing a notification indicative of an existence of the one or more valuable preview image, or
displaying a representation of the one or more valuable preview images.

9. The method of claim 8, wherein the displaying of the representation of the one or more valuable preview images comprises displaying the one or more valuable preview images in a sorted order according to the respective values of user level of interest associated with the one or more valuable preview images.

10. The method of claim 1, wherein the providing of the one or more valuable preview images or the one or more representatives thereof for selection by the user further comprises determining whether an input is received, the input indicative of a selection of at least one image of the one or more valuable preview images for non-temporary storage.

11. The method of claim 10, further comprising deleting the one or more valuable preview images in response to a determination that no input is received.

12. The method of claim 1, wherein the detecting that the preview image of the stream of preview images contains the one or more TOIs comprises:
identifying one or more elements in a content of the preview image;
determining whether the one or more elements belong to any of one or more predefined categories to obtain the one or more TOIs; and
obtaining one or more respective confidence levels associated with the one or more predefined categories of the one or more TOIs, each confidence level indicative of a degree of likelihood that a respective element of the one or more elements belongs to one or more categories of the TOIs.

13. The method of claim 12, further comprising receiving a user input that defines the one or more predefined categories.

14. The method of claim 12, wherein the evaluating of the user level of interest in the preview image comprises:

obtaining one or more respective interest values associated with the one or more predefined categories of the one or more TOIs;
computing an overall user interest value regarding the image according to the one or more interest values and the one or more confidence levels associated with the one or more predefined categories of the one or more TOIs; and
setting the value of the evaluated user level of interest in the preview image based on the overall user interest value regarding the preview image.

15. The method of claim 14, further comprising:
receiving a user input indicative of a selection from one or more valuable preview images of the stream of one or more preview images; and
updating at least one interest value associated with at least one of the one or more predefined categories according to the selection.

16. The method of claim 1, further comprising:
maintaining a record of one or more criteria for use in the evaluating of the user level of interest in the preview image by performing at least one of:
receiving a first user input indicative of a user preference,
receiving information about configuration settings,
identifying and recording a user selection of one or more preview images of the stream of one or more preview images,
identifying and recording one or more patterns in one or more offline photo albums,
identifying and recording one or more patterns in one or more online albums,
identifying and recording a user preference of images on one or more social networks, or
identifying and recording personal information contained in an online user profile.

17. The method of claim 1, wherein the determining of whether any preview image of the stream of one or more preview images is valuable comprises:
identifying one or more elements in a first preview image as belonging to one or more predefined categories; and
evaluating whether the first preview image as being valuable based on the one or more predefined categories.

18. The method of claim 1, wherein the determining of whether any preview image of the stream of one or more preview images is valuable comprises determining a preview image of the stream of one or more preview images is valuable when the preview image contains one or more target of interests (TOIs) and is evaluated to have an overall user interest value higher than a threshold value.

19. An electronic apparatus, comprising:
one or more processors capable of performing operations comprising:
receiving a stream of one or more preview images in a preview mode of the electronic apparatus;
determining whether any preview image of the stream of preview images is valuable by determining whether each of the preview images contains a target of interest (TOI) and evaluating a respective user level of interest; and
controlling an operation of the electronic apparatus in response to the determining, and, in an event that one or more preview images of the stream of one or more preview images are determined to be valuable, performing operations comprising:

providing the one or more valuable preview images or one or more representatives thereof for selection by a user;

in response to a selection of at least one of the one or more valuable preview images by the user, non-temporarily storing the at least one selected valuable preview image of the one or more valuable preview images;

deleting at least one non-selected valuable preview image of the one or more valuable preview images;

switching the electronic apparatus from the preview mode to a capture mode; and capturing a stream of images in the capture mode such that a quality of the images captured in the capture mode is better than a quality of the one or more preview images.

20. The electronic apparatus of claim 19, wherein, in controlling the operation of the electronic apparatus in response to the determining, the one or more processors are configured to temporarily store the one or more valuable preview images in response to the determining.

21. The electronic apparatus of claim 20, wherein, in controlling the operation of the electronic apparatus in response to the determining, the one or more processors are configured to maintain an operation of the electronic apparatus in the preview mode without temporarily storing any of the preview images in an event that no preview image of the stream of one or more preview images is determined to be valuable.

22. The electronic apparatus of claim 20, wherein the one or more processors are configured to temporarily store the one or more valuable preview images in the preview mode.

23. The electronic apparatus of claim 20, wherein, in controlling the operation of the electronic apparatus in response to the determining, the one or more processors are further configured to switch the electronic apparatus from the preview mode to a capture mode in which the electronic apparatus captures one or more images, and wherein the one or more processors are configured to temporarily store the one or more valuable preview images in the capture mode.

24. The electronic apparatus of claim 23, wherein the one or more processors are further configured to trigger a video recording to record one or more video images when the electronic apparatus operates in the capture mode.

25. The electronic apparatus of claim 24, wherein the one or more processors are further configured to perform operations comprising:

determining whether any image in the video recording is valuable; and stopping the video recording in response to a determination that no image among a predetermined number of images in the video recording is valuable.

26. The electronic apparatus of claim 19, wherein, in providing the one or more valuable preview images or the one or more representatives thereof for selection by the user, the one or more processors are configured to perform either or both of:

providing a notification indicative of an existence of the one or more valuable preview image, or displaying a representation of the one or more valuable preview images.

27. The electronic apparatus of claim 26, wherein, in displaying the representation of the one or more valuable preview images, the one or more processors are configured to display the one or more valuable preview images in a sorted order according to the respective values of user level of interest associated with the one or more valuable preview images.

28. The electronic apparatus of claim 19, wherein, in providing the one or more valuable preview images or the one or more representatives thereof for selection by the user, the one or more processors are further configured to determine whether an input is received, the input indicative of a selection of at least one image of the one or more valuable preview images for non-temporary storage.

29. The electronic apparatus of claim 28, wherein the one or more processors are further configured to delete the one or more valuable preview images in response to a determination that no input is received.

30. The electronic apparatus of claim 19, wherein, in determining whether any preview image of the stream of preview images is valuable, the one or more processors are configured to perform operations comprising:

detecting that a preview image of the stream of preview images contains one or more target of interests (TOIs);

evaluating a user level of interest in the preview image; and determining that the preview image is valuable according to at least a value of the evaluated user level of interest in the preview image.

31. The electronic apparatus of claim 30, wherein, in detecting that the preview image of the stream of preview images contains the one or more TOIs, the one or more processors are configured to perform operations comprising:

identifying one or more elements in a content of the preview image;

determining whether the one or more elements belong to any of one or more predefined categories to obtain the one or more TOIs; and obtaining one or more respective confidence levels associated with the one or more predefined categories of the one or more TOIs, each confidence level indicative of a degree of likelihood that a respective element of the one or more elements belongs to one or more categories of the TOIs.

32. The electronic apparatus of claim 31, wherein the one or more processors are further configured to receive a user input that defines the one or more predefined categories.

33. The electronic apparatus of claim 31, wherein, in evaluating the user level of interest in the preview image, the one or more processors are configured to perform operations comprising:

obtaining one or more respective interest values associated with the one or more predefined categories of the one or more TOIs;

computing an overall user interest value regarding the image according to the one or more interest values and the one or more confidence levels associated with the one or more predefined categories of the one or more TOIs; and setting the value of the evaluated user level of interest in the preview image based on the overall user interest value regarding the preview image.

34. The electronic apparatus of claim 32, wherein the one or more processors are further configured to perform operations comprising:

receiving a user input indicative of a selection from one or more valuable preview images of the stream of one or more preview images; and updating at least one interest value associated with at least one of the one or more predefined categories according to the selection.

35. The electronic apparatus of claim 30, wherein the one or more processors are further configured to perform operations comprising:
maintaining a record of one or more criteria for use in the evaluating of the user level of interest in the preview image by performing at least one of:
receiving a first user input indicative of a user preference,
receiving information about configuration settings,
identifying and recording a user selection of one or more preview images of the stream of one or more preview images,
identifying and recording one or more patterns in one or more offline photo albums,
identifying and recording one or more patterns in one or more online albums,
identifying and recording a user preference of images on one or more social networks, or
identifying and recording personal information contained in an online user profile.

36. The electronic apparatus of claim 19, wherein, in determining whether any preview image of the stream of one or more preview images is valuable, the one or more processors are configured to perform operations comprising:
identifying one or more elements in a first preview image as belonging to one or more predefined categories; and
evaluating whether the first preview image as being valuable based on the one or more predefined categories.

37. The electronic apparatus of claim 19, wherein, in determining whether any preview image of the stream of one or more preview images is valuable, the one or more processors are configured to determine a preview image of the stream of one or more preview images is valuable when the preview image contains one or more target of interests (TOIs) and is evaluated to have an overall user interest value higher than a threshold value.

* * * * *